(12) United States Patent
Archer et al.

(10) Patent No.: US 12,414,575 B2
(45) Date of Patent: Sep. 16, 2025

(54) PROCESS AND APPARATUS FOR PHASE-CHANGE EXTRUSION OF AQUEOUS MATERIAL

(71) Applicant: Massey University, Palmerston North (NZ)

(72) Inventors: Richard Hamilton Archer, Palmerston North (NZ); Lindsay James Robertson, Palmerston North (NZ); Jolin Morel, Palmerston North (NZ)

(73) Assignee: Massey University, Palmerston North (NZ)

( * ) Notice: Subject to any disclaimer, the term of this patent is extended or adjusted under 35 U.S.C. 154(b) by 815 days.

(21) Appl. No.: 17/613,127

(22) PCT Filed: Mar. 31, 2020

(86) PCT No.: PCT/IB2020/053033
§ 371 (c)(1),
(2) Date: Nov. 22, 2021

(87) PCT Pub. No.: WO2020/240287
PCT Pub. Date: Dec. 3, 2020

(65) Prior Publication Data
US 2022/0211058 A1    Jul. 7, 2022

(30) Foreign Application Priority Data

May 30, 2019 (NZ) .......................... 754071
Oct. 31, 2019 (AU) ................... 2019904102

(51) Int. Cl.
*A23B 7/04* (2006.01)
*A23B 2/80* (2025.01)
(Continued)

(52) U.S. Cl.
CPC .......... *A23B 7/0416* (2013.01); *A23B 2/8033* (2025.01); *A23B 11/1403* (2025.01); *A23L 2/12* (2013.01)

(58) Field of Classification Search
CPC ..... A23B 7/0416; A23B 11/1403; A23L 2/12; A23L 3/362
See application file for complete search history.

(56) References Cited

U.S. PATENT DOCUMENTS 2,821,070 A   1/1958   Watt et al.
5,868,065 A * 2/1999   Haggerty ................. A23G 9/16
                                                    366/144

(Continued)

FOREIGN PATENT DOCUMENTS

WO      2018/222677 A1   12/2018

OTHER PUBLICATIONS

PCT International Search Report for PCT Application No. PCT/IB2020/053033 mailed Jul. 2, 2020 (5 pages).

(Continued)

*Primary Examiner* — Jenna A Watts
(74) *Attorney, Agent, or Firm* — Merchant & Gould P.C.

(57) ABSTRACT

The invention relates to a continuous process for freezing a flow of aqueous material in liquid form and moving the aqueous material through at least one tube from an inlet of the tube to an outlet of the tube so as to form a breakable or cuttable frozen extrusion without bursting the tube. The process creates an extruded material that comprises liquid aqueous material entrapped between frozen aqueous material to self-lubricate the extrusion as it moves through the tube. An apparatus for carrying out the process of the invention is also provided.

16 Claims, 9 Drawing Sheets

(51) Int. Cl.
*A23B 11/14* (2025.01)
*A23L 2/12* (2006.01)

(56) References Cited

U.S. PATENT DOCUMENTS

| | | |
|---|---|---|
| 5,919,510 A | 7/1999 | Fayard et al. |
| 7,832,313 B2 | 11/2010 | Hermansen et al. |
| 2009/0142462 A1 | 6/2009 | Zhu |

OTHER PUBLICATIONS

PCT Written Opinion for PCT Application No. PCT/IB2020/053033 mailed Jul. 2, 2020 (5 pages).
PCT International Preliminary Report on Patentability for PCT Application No. PCT/IB2020/053033 mailed Dec. 10, 2021 (6 pages).

\* cited by examiner

PROCESS AND APPARATUS FOR PHASE-CHANGE EXTRUSION OF AQUEOUS MATERIAL

CROSS-REFERENCE TO RELATED APPLICATIONS

This application is a National Stage Application of PCT/IB2020/053033 filed 31 Mar. 2020, which claims the benefit of Serial No. 754071, filed 30 May 2019 in New Zealand and Serial No. 2019904102, filed 31 Oct. 2019 in Australia, and which applications are incorporated herein by reference. To the extent appropriate, a claim of priority is made to each of the above disclosed applications in their entirety.

FIELD OF THE INVENTION

This invention relates to a process and apparatus for freezing certain types of liquid aqueous material to form discrete semi-solid units. In some embodiments, the process is continuous.

BACKGROUND

In some situations, it may be useful to store and/or transport material in frozen form instead of in liquid form. This may especially be the case where the material is a perishable food and where transportation of the food may be slow or delayed. For example, in small-scale milk producing farms, milk may not be collected and transported to a processing plant on a daily basis. In some cases, the cost of transporting milk may be uneconomic unless the milk can be collected only once per week or once per fortnight. For such a case it is important to be able to store the milk in a way that maintains the integrity of the product until the milk reaches the processing plant. One way of storing milk while preventing bacterial growth, spoilage, and changes to organoleptic properties is to freeze the milk. A similar situation may arise with other small-scale facilities that produce liquid aqueous materials, such as juice that needs to be transported to a processing plant, or chemicals.

The density of pure ice is significantly lower than that of pure water. When pure water freezes within a closed vessel, such as a pipe, the increased volume of the ice within the pipe can cause extremely large stresses and may cause the pipe to burst. For this reason, it is known to use a batch process of freezing in which liquid aqueous material is held in a storage vessel having a greater volume than that needed to hold the liquid and being of sufficient volume to hold the liquid when frozen into a solid. But batch freezing is slow and causes preferential freezing of the pure water content of the liquid, creating a reduction in the freezing point of any remaining aqueous component of the liquid material and causing concentration of other solutes in the liquid. Furthermore, where a liquid aqueous solution/suspension/emulsion freezes slowly, a gross segregation of components occurs, with consequent damage in the cases of many foods. The gross segregation of components may be acceptable or even advantageous where the objective is to store the latent heat of freezing or achieve freeze concentration; however this phenomenon is unacceptable in cases where the retention of physical and sensory properties of the feedstock is the primary aim of the process. Where slow freezing occurs, large crystals of pure ice form, and these crystals are likely to cause mechanical damage to food components and structures, such as milk fat globules. Where the liquid to be frozen is biological in nature, undesirable degradation may result from preferential freezing of water into ice crystals within the liquid. The progressive concentration of solutes may also allow solute crystals to form, as concentrations reach saturation levels within large pockets of unfrozen liquid. The solute crystals damage the smooth nature of the product and may consequently distort the mouthfeel (if the product is a food product) or other characteristics of the product. Batch freezing methods also require extensive product handling to fill the vessels, empty them of the frozen product, and repack the frozen products into a more compact form for storage. This requires either significant labour and labour costs, or significant automation and hence increased capital and maintenance costs.

Where the liquid aqueous material includes an emulsion or stable dispersion, the progressive increase in concentration of emulsion components (such as micellar milk proteins and milk fat globules) and suspended solid particles within large pockets of unfrozen liquid may also destabilise the emulsion, allow the precipitation of components, and/or cause suspended particles to form stable aggregates. These effects distort the homogeneity of the product and, in the case of food products, transform a smooth mouthfeel to one of hard, sandy lumps. This can occur during slow freezing of bulk liquid.

It is an object of at least preferred embodiments of the present invention to address one of the abovementioned disadvantages and/or to at least provide the public with a useful alternative to existing methods of freezing liquid aqueous material.

In this specification where reference has been made to patent specifications, other external documents, or other sources of information, this is generally to provide a context for discussing features of the invention. Unless specifically stated otherwise, reference to such external documents or sources of information is not to be construed as an admission that such documents or such sources of information, in any jurisdiction, are prior art or form part of the common general knowledge in the art.

SUMMARY OF THE INVENTION

In one aspect, the invention provides a continuous process for freezing a flow of aqueous material in liquid form and moving the aqueous material through at least one tube having an inlet and an outlet, the process comprising the steps of: continuously pumping aqueous material in liquid form into the tube inlet under pressure; cooling the liquid aqueous material to cause a progressive phase change in which substantially all of the aqueous material changes from liquid form to frozen form within the tube, and in which at least some liquid aqueous material is entrapped between the frozen aqueous material to form a self-lubricating frozen extrusion; pumping the aqueous material through the tube from the tube inlet to the tube outlet; and discharging at least a portion of the aqueous material through the tube outlet as a breakable or cuttable frozen extrusion.

In some forms, the material is cooled to frozen form as the material moves along the length of the tube.

In some forms, the extrusion is broken or cut into discrete lengths before or after passing through the outlet.

Preferably, the aqueous material is a food product. In some forms, the aqueous material is milk. In other forms, the aqueous material is juice.

Alternatively, the aqueous material is a chemical product.

In some forms, the aqueous material in liquid form comprises a solution, emulsion or suspension.

Preferably, the pump operates between about 10 MPa and about 60 MPa. The aqueous material is optionally held under pressure within the tube at a pressure of between about 1.5 MPa to about 20 MPa.

In some forms, the aqueous material is cooled to a temperature within the freezing point range of the aqueous material. Optionally, a rate of freezing the aqueous material exceeds 0.001/s for aqueous material that has a bulk freezing point depression greater than or equal to 0.4° C. In some forms, the rate of freezing of the aqueous material exceeds 0.01/s for feedstocks that have a bulk freezing point depression greater than or equal to 0.4° C.

Optionally, the aqueous material is pumped through the tube at a flow rate corresponding to a residence time of about 10 minutes.

In some forms, the liquid aqueous material is pumped into a plurality of tubes generally simultaneously and wherein the aqueous material is cooled in each tube generally simultaneously to cause a progressive phase change of the aqueous material between liquid form and frozen form in each tube.

In some forms, the liquid aqueous material comprises any one of the following: fruit juice, fruit pulp, ovine milk, bovine milk, smoothie mix, coffee concentrate, coffee concentrates with tabletting excipient to a total solids content of 50% w/w, bovine whole milk at about 50% total solids w/w, bovine skim milk at about 50% total solids w/w and bovine cream at approximately 40% total solids w/w.

Also disclosed herein is an apparatus for continuously freezing a flow of aqueous liquid material and moving the liquid through at least one tube. The apparatus comprises at least one tube comprising an inlet for receiving aqueous material in liquid form and an outlet for discharging the aqueous material in frozen form; a cooling element to cause a progressive phase change in the aqueous material from liquid form to a frozen extrusion within the tube; and a pump connected to the tube to pump the aqueous material through the tube.

The apparatus may optionally comprise a receiving element for receiving and holding the frozen aqueous material discharged from the tube.

In some forms, the apparatus comprises a reservoir for aqueous liquid material, the reservoir being in liquid connection with the tube inlet to feed aqueous liquid to the tube.

The apparatus of any one of the preceding claims and further comprising at least one valve between the reservoir and the tube inlet.

In some forms, the apparatus comprises a programmable controller connected to the pump and the cooling element, the controller being programmable to control the pump to control the rate of material flow through the tube, and to control the temperature of the cooling element to control the rate of phase change of the aqueous material between liquid and frozen.

Preferably, the tube comprises an internal diameter of between 4 mm and 50 mm.

In some forms, the tube comprises an internal diameter of 25 mm.

In some forms, the apparatus comprises a bearing surface proximate the outlet and configured to break off a section of frozen aqueous material from the frozen extrusion when an end of the frozen extrusion presses against the bearing surface.

Optionally, the bearing surface is located within the tube and is at or distanced from the outlet.

Alternatively, the bearing surface is located external to the tube and located at or distanced from the outlet.

In some forms, the pump is configured to operate at about 10 to about 60 MPa.

Optionally, the tube is a generally straight elongate tube.

In some forms, the apparatus comprises a plurality of elongate tubes located in parallel to form a tube bank.

In some forms, the tube comprises a generally helical shape.

In some forms, the apparatus comprises a plurality of tubes, each tube having a generally helical shape.

In some forms, the tube(s) is/are integral with or is/are located within a heat exchanger.

Optionally, the, or each, tube comprises an inner tube that is located within an outer tube, forming the cooling element, to form a heat exchanger.

In some forms, the heat exchanger comprises a tube in tube heat exchanger.

Optionally, the heat exchanger is a co-current heat exchanger.

In some forms, the apparatus is configured to rapidly cool the material so as to form dendrites within the material and so as to entrap liquid between at least some of the dendrites.

This invention may also be said broadly to consist in the parts, elements and features referred to or indicated in the specification of the application, individually or collectively, and any or all combinations of any two or more said parts, elements or features. Where specific integers are mentioned herein which have known equivalents in the art to which this invention relates, such known equivalents are deemed to be incorporated herein as if individually described.

The term 'comprising' as used in this specification and claims means 'consisting at least in part of'. When interpreting statements in this specification and claims that include the term 'comprising', other features besides those prefaced by this term can also be present. Related terms such as 'comprise' and 'comprised' are to be interpreted in a similar manner.

It is intended that reference to a range of numbers disclosed herein (for example, 1 to 10) also incorporates reference to all rational numbers within that range and any range of rational numbers within that range (for example, 1 to 6, 1.5 to 5.5 and 3.1 to 10). Therefore, all sub-ranges of all ranges expressly disclosed herein are hereby expressly disclosed.

As used herein the term '(5)' following a noun means the plural and/or singular form of that noun. As used herein the term 'and/or' means 'and' or 'or', or where the context allows, both.

BRIEF DESCRIPTION OF THE DRAWINGS

The present invention will now be described by way of example only and with reference to the accompanying drawings in which:

FIG. 4a is a cross-sectional view taken along line A-A of FIG. 4a;

DETAILED DESCRIPTION OF A PREFERRED EMBODIMENT

As shown in FIGS. 1 to 5, the invention generally relates to an apparatus and process for continuously freezing a flow of liquid aqueous feedstock material to produce an extrusion of material in semi-solid frozen form. The frozen extrusion may be cut or broken into smaller lengths/units, such as pellets or rods for example, and may be stored in frozen form. FIGS. 6 to 9 help to illustrate the materials science that supports the apparatus and process of the invention.

The apparatus and process of the invention may be configured to provide rapid freezing of liquid aqueous materials to create a matrix of microscopic dendrite crystals within the material and between which liquid is trapped. In some forms, the frozen fraction of the aqueous/water portion of the frozen material will be between about 60% to about 98%. The entrapped liquid is more concentrated than the initial feedstock and exhibits a lower freezing point (FP) than the frozen portion of the material, i.e. $Tf-FP \leq Tw$, where $Tf$ is the initial freezing point of the feedstock and $Tw$ is the wall-feedstock interface temperature, i.e. the inner surface of the tube wall. As such, at the coolant temperature, the entrapped liquid remains in liquid form between the frozen dendrite crystals, helping to lubricate the semi-solid material as it is moved through the apparatus.

Within this specification and claims, the term "aqueous materials" is intended to mean aqueous solutions that may additionally include, emulsions, dispersions or suspensions of insoluble materials in liquid or frozen form or in a semi-solid frozen form, depending on the context. Unless the context clearly indicates otherwise, within this specification and claims, the term "frozen", in relation to aqueous materials to be used with the invention, refers to liquid aqueous materials that have been frozen to comprise a dendritic structure with liquid trapped between at least some of the dendrites, so that the material includes a partial liquid content having significant FPD and a partial frozen, solid content, so that the material largely behaves as a solid in that the material is breakable and cuttable into discrete units as desired.

Figure 1:
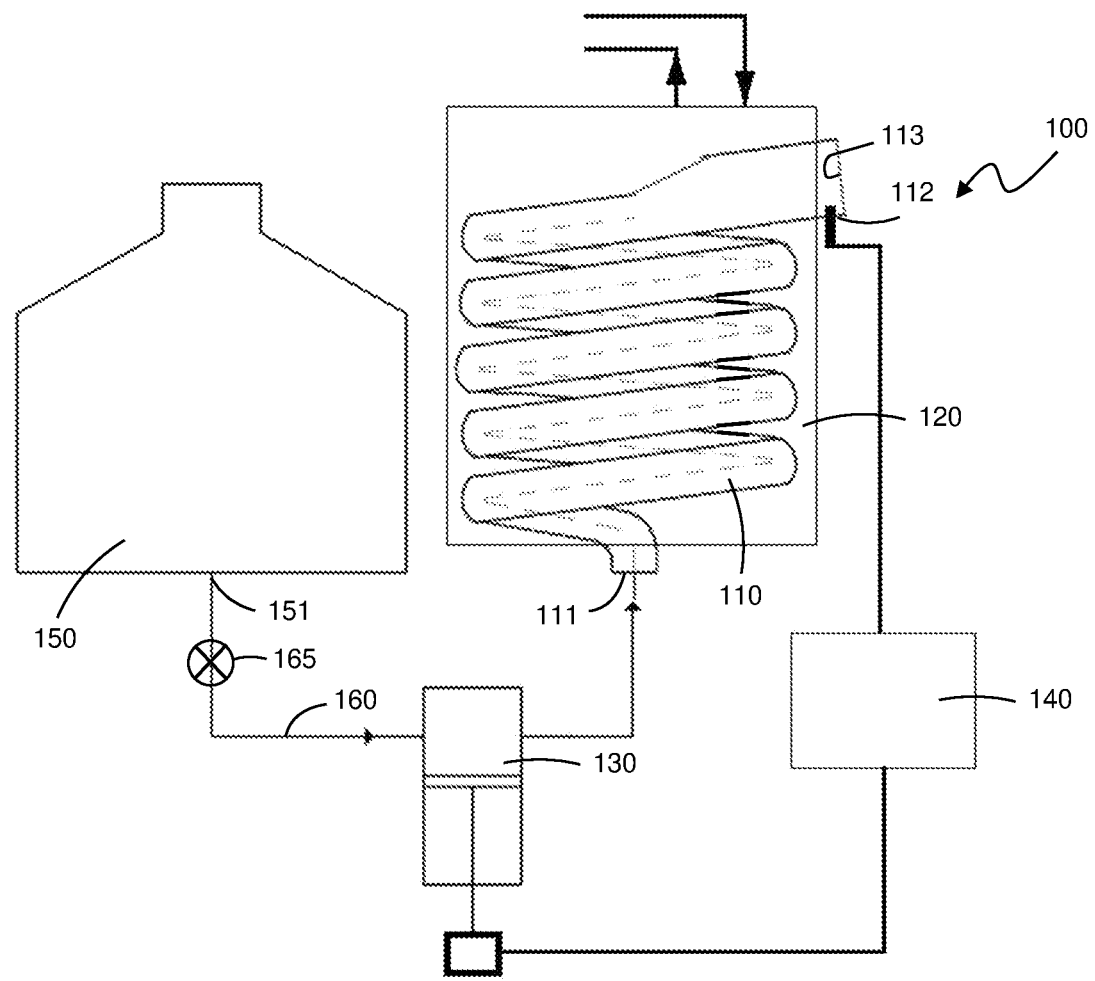
FIG. 1 illustrates one form of apparatus according to the invention.

FIG. 1 shows one form of apparatus for continuously freezing a flow of liquid aqueous feedstock material that is fed into the apparatus in liquid form. The apparatus 100 comprises an extrusion tube 110 having an inlet end portion at which an inlet 111 is located and having an outlet end portion at which an outlet 112 is located. In some forms, the inlet 111 and outlet 112 are located at opposite ends of the tube 110. The extrusion tube is typically formed of metal or another material or combination of materials with high thermal conductivity. The inlet 111 is configured to receive the aqueous material in liquid form. The outlet 112 is configured to discharge the aqueous material in frozen form, such as by extruding or releasing the frozen material through the outlet. The aqueous material freezes within the extrusion tube 110 to form a frozen extrusion that is caused to move through the extrusion tube 110 and out the outlet 112 as more liquid aqueous material enters the inlet 111.

The extrusion tube 110 is defined by a tube wall and may have any lateral cross-sectional shape that allows material to be readily moved through the tube 110. In some forms, the extrusion tube 110 has a generally round/circular lateral cross-section. In other forms, the extrusion tube 110 may have an oval, regular or irregular lateral cross-section. In some forms, the extrusion tube 110 has a consistent lateral cross-section along its length. However, in other forms, the extrusion tube 110 has a variable lateral cross-section along its length. For example, the lateral cross-section of the tube may increase in size toward the outlet end, as shown in FIG. 1. In other forms, the extrusion tube 110 may comprise one or more regions having a lateral cross-section of increased size at any suitable location between the inlet 111 and the outlet 112 to facilitate movement of the frozen extrusion. Typically, liquid that enters the inlet 111 of the extrusion tube 110 is frozen to form an extrusion having a shape corresponding to the shape of the interior of the tube. The frozen extrusion is discharged from the tube 110 through the outlet 112. Therefore, it is preferable that the lateral cross-section at the outlet end portion of the tube 110 is no smaller than the smallest lateral cross-section of the tube between the inlet 111 and the outlet 112. In preferred forms, the extrusion tube 110 comprises a circular lateral cross-section defined by the tube wall, which has an internal diameter defined by an internal surface of the tube wall, and an external diameter defined by an external surface of the tube wall.

Figure 2:
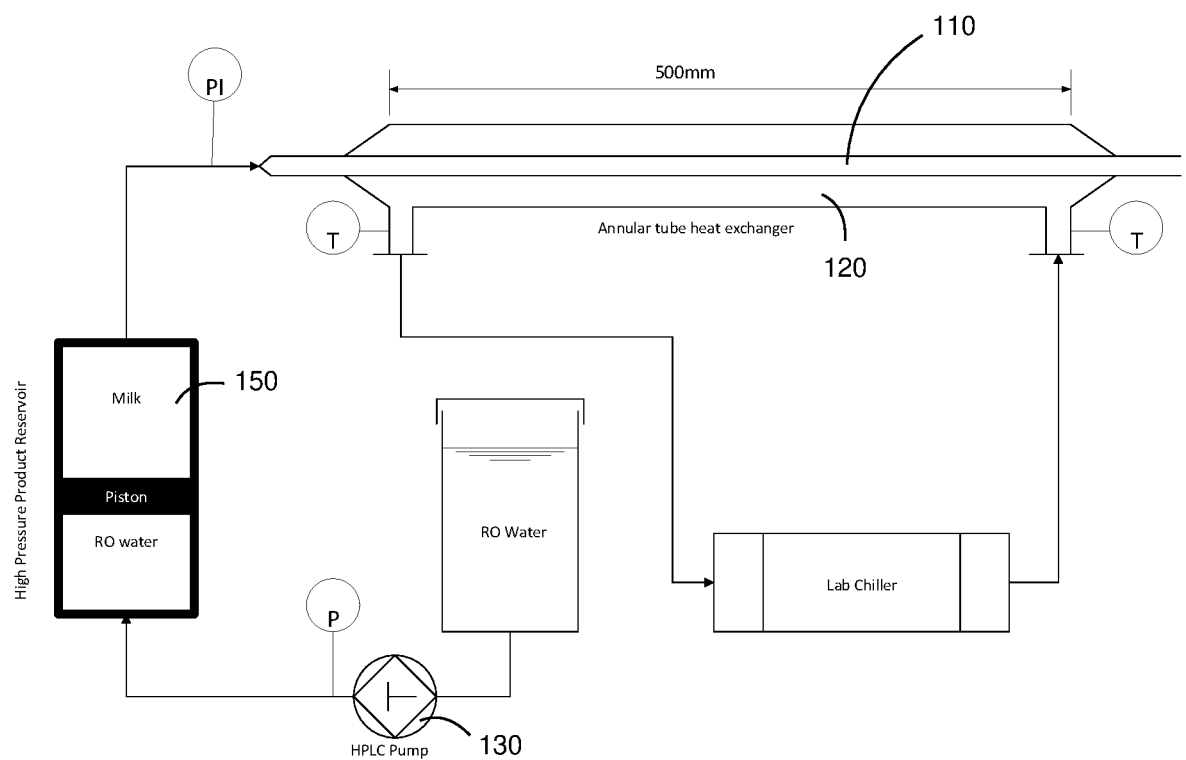
FIG. 2 illustrates another form of apparatus according to the invention.
Figure 3:
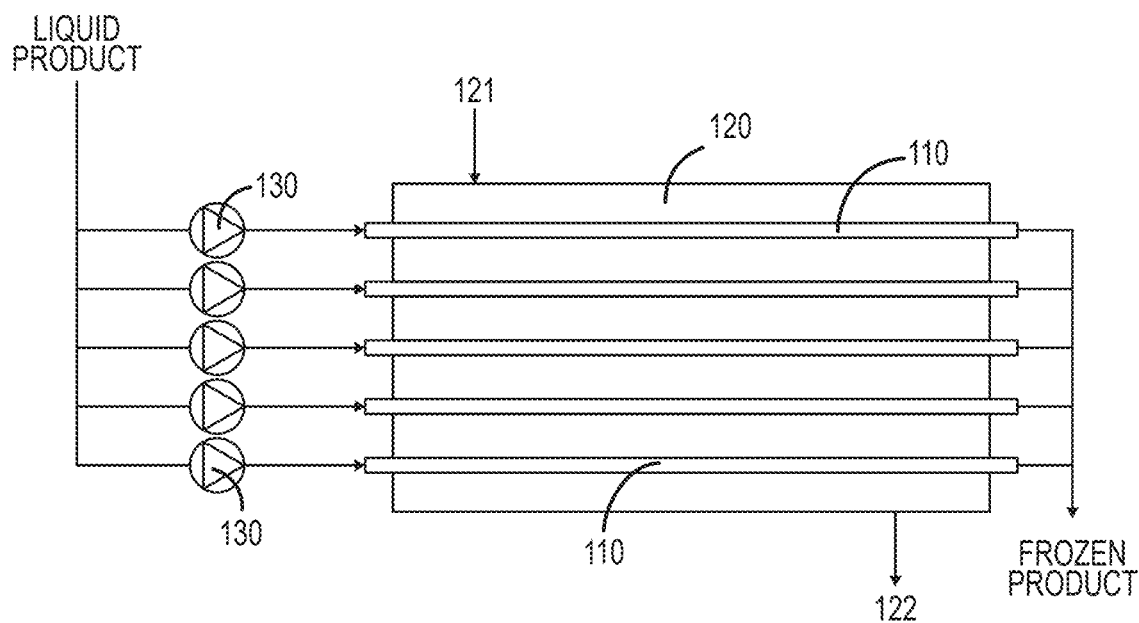
FIGS. 3 and 3a illustrate yet another form of apparatus according to the invention.
Figure 3A:
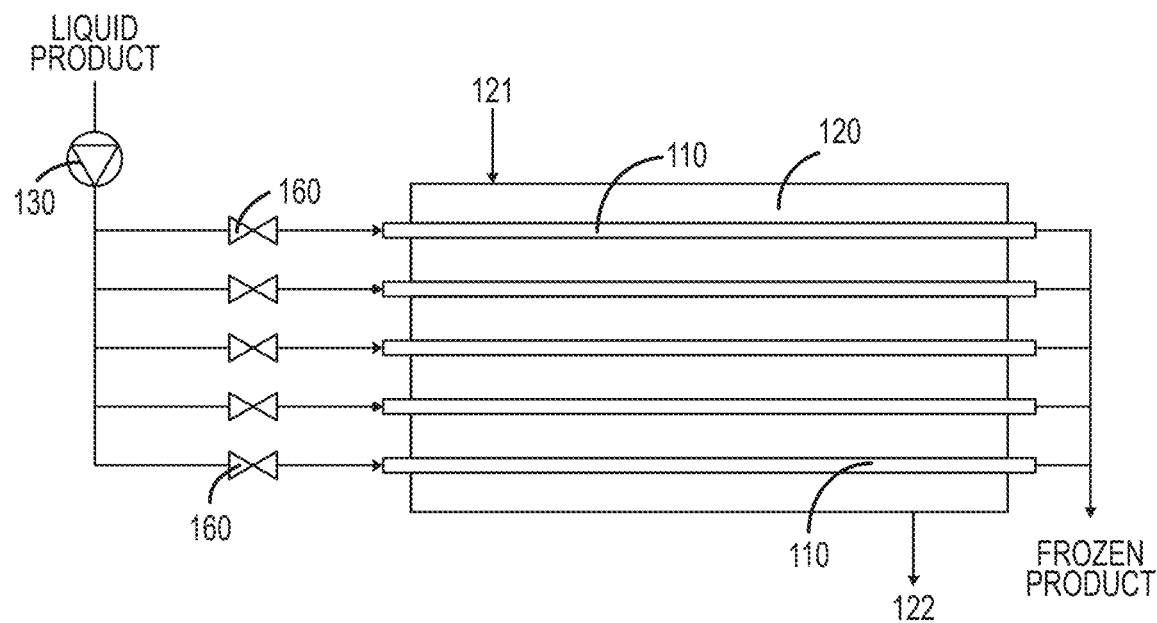

The extrusion tube 110 may be of any suitable width/diameter and length to achieve the desired rate of freezing of the liquid aqueous material that is fed into the tube. In some forms, the tube has a circular lateral cross-section with an internal diameter of between about 4 mm and about 50 mm. In one form, the extrusion tube comprises an internal diameter of about 6 mm. In another form, the extrusion tube 110 comprises an internal diameter of about 12 mm. The extrusion tube 110 may have a tube wall of any suitable thickness to safely withstand the pressure imposed on it. In one example, the extrusion tube 110 has a generally circular lateral cross-section with an internal diameter of about 10 mm, a tube wall thickness of about 2 mm and an external diameter of about 14 mm. In another form, the tube 110 has an internal diameter of about 6 mm, a tube wall thickness of about 1 mm, and an external diameter of about 8 mm. The extrusion tube 110 may be of any suitable shape along its length. For example, as shown in FIG. 1, the extrusion tube 110 may have a generally helical shape along its length or along at least a portion of its length. The helix may follow a constant radius bend. A helical extrusion tube is beneficial in that a 5 m tube having a helical shape has a shorter overall packaging length than a 5 m tube that is straight. In some forms, the apparatus may comprise a plurality of extrusion tubes, each of which have a generally helical shape or comprise a helical shape along at least a portion of the tube length. However, in another form the extrusion tube 110 may be generally straight along its length, as shown in FIG. 2, or the extrusion tube 110 may comprise at least one straight portion and/or at least one curved or angled portion along its length. In some forms, the apparatus may comprise a plurality of generally straight extrusion tubes that are located in parallel to form a tube bank, such as shown in FIGS. 3 and 3a. The, or each, extrusion tube 110, regardless of shape, may lie generally along a horizontal axis as shown in FIGS. 3 and 3a, a vertical axis or a diagonal axis. In some forms, the extrusion tube 110 forms part of a heat exchanger and lies along a vertical axis or a horizontal axis. The heat exchanger may be a helical heat exchanger or a straight tube heat exchanger or any other suitable configuration.

In some forms, the extrusion tube 110 may also be made of a material that has a low friction and adhesion strength between the frozen extrusion and the tube 110, such as perfluorinated polymers like PTFE. Reduced friction and adhesion strength may be achieved by reducing the surface energy, reducing the adhesive area, or reducing surface roughness of the interior surface of the tube 110. In some forms, at least a portion of the interior surface of the extrusion tube 110 may comprise a surface modification, such as a coating or a change to the surface texture or to the chemical properties of the interior surface, to reduce friction and adhesion strength between the frozen extrusion and the tube 110. For example, a nano/micro/macro scale coating may be applied to at least a portion of the interior surface of the tube 110. In some forms, the coating may be a spray-on coating or a dip coating. In other forms, a physical modification may be made to at least a portion of the interior surface to smooth the surface in order to reduce friction and adhesion. In some forms, a physical modification may be made by mechanical, electrochemical or laser surfacing methods (such as polishing), In some forms, the interior surface of the tube 110 may be subject to a chemical modification by applying organic molecules to the surface, implanting reactive ions or noble gases in the surface, applying plasma surface modification techniques, applying chemical vapour deposition modification techniques, or modifying the surface to form a "liquid-like" surface (such as a slippery liquid-infused porous surface).

Feedstock may be fed to the inlet 111 of the extrusion tube 110 from a liquid supply element, such as a reservoir 150 in which liquid aqueous feedstock material is held. In some forms, the reservoir 150 forms part of the apparatus 100 and in other forms, the reservoir is separate to and is connectable to the apparatus 100. For example, the extrusion tube 110 of the apparatus may be connectable to a reservoir 150 that is already on-site, such as an existing tank/vessel on site that is otherwise separate to the apparatus 100. The tank/vessel may comprise a milk vat if the liquid to be frozen is milk.

The reservoir 150 comprises an outlet 151 that is in liquid connection with the inlet 111 via a feedstock flow path 160, such as a liquid conduit. In this arrangement, feedstock liquid may flow from the reservoir 150, through the reservoir outlet 151, along the flow path/liquid conduit 160 and into the extrusion tube 110 through the inlet 111. One or more valves 165 may be located along the feedstock flow path 160 and may be manipulated to open or close the feedstock flow path 160 in order to allow liquid flow to the extrusion tube 110 or to prevent liquid flow to the extrusion tube 110. The one or more valves 160 may also be configured to control the rate of liquid flow to the extrusion tube 110, such as by partially opening/closing a valve to slow liquid flow compared to a fully open valve. Where the apparatus comprises multiple extrusion tubes 110, as shown in FIGS. 3 and 3a, one or more valves 160 may be configured to control the flow of liquid feedstock material to each tube 110 or a single valve 160 may be configured to control the flow of liquid feedstock material to multiple tubes 110. For example, a single rotary valve 160 may be configured to control flow of liquid feedstock material to all tubes 110.

The apparatus 100 may also comprise a pump 130. The pump 130 may be configured to draw aqueous feedstock material from the reservoir 150 and then pump the liquid into the inlet 111 of the extrusion tube 110. By pumping aqueous material through the inlet 111, the pump 130 also causes the existing aqueous material within the tube 110 to move along/through the extrusion tube 110 between the inlet 111 and the outlet 112, due to the pressure of the incoming liquid pressing against existing aqueous material within the extrusion tube 110. In some embodiments, the pump 130 may be a high-pressure pump, such as a high-pressure positive displacement pump operating between about 10 to about 60 MPa. Where the apparatus comprises extrusion tubes 110, as shown in FIGS. 3 and 3a, one or more pumps 130 may be configured to control the flow of liquid feedstock material to each tube 110 or a single pump 130 may be configured to control the flow of liquid feedstock material to multiple tubes 110.

The apparatus 100 also comprises a cooling element 120 configured to cool the aqueous material within the extrusion tube 110 so as to cause a phase change in the aqueous material from liquid form to frozen form. In some forms, the extrusion tube 110 and cooling element 120 together form a heat exchanger. For example, the extrusion tube 110 may form part of a heat exchanger. In some forms, the extrusion tube 110 consists of an inner tube that is located within a cooling element 120 comprising an outer tube. The inner and outer tubes 110, 120 comprise part of a tube-in-tube heat exchanger, as shown in FIG. 2. In this form, the outer tube 120 may hold a cooling material, such as a refrigerant or heat transfer fluid, to cool aqueous material within the inner tube 110 by heat transfer through the wall of the inner tube 110. Where the apparatus comprises multiple extrusion tubes 110, each of the tubes 110 may be located within a single cooling element/outer tube 120 or each of the tubes 110 may form an inner tube located within a respective outer tube 120.

In some forms, the cooling element comprises a vessel, such as a tube, through which cooling fluid flows from a cooling element inlet 121 to a cooling element outlet 122, as shown in FIGS. 3 and 3a. The cooling fluid may be in liquid gas, or two-phase form. In some forms, the cooling element inlet 121 may be located proximate to the extrusion tube inlet 111 and the cooling element outlet 122 may be located proximate to the extrusion tube outlet 112 to form a co-current heat exchanger configured to maximise the temperature drop at the inlet portion of the extrusion tube 110. In other forms, the cooling element inlet 121 may be located proximate the extrusion tube outlet 112 and the cooling element outlet 122 may be located proximate the extrusion tube inlet 111 to form a counter-current heat exchanger. In yet another form, the extrusion tube 110 and cooling element 120 may be configured to form a cross-current heat exchanger.

In some forms, the apparatus may be configured to provide cooling to only a portion of the extrusion tube 110. For example, the extrusion tube 110 may comprise a cooling portion that is exposed to cooling by the cooling element 120 and the tube 110 may also comprise a non-cooling portion that is not exposed to cooling by the cooling element 120. In some forms, the extrusion tube 110 may comprise a cooling portion that extends along only part of the tube length. The cooling portion may be located toward the tube inlet 111 or the tube outlet 112 or substantially centrally between the tube inlet 111 and tube outlet 112.

Figure 4:
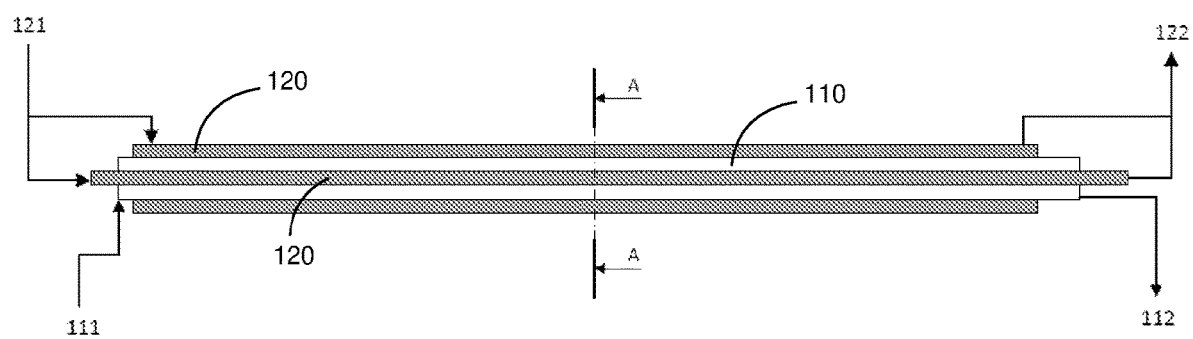
FIG. 4 is a side view that illustrates another form of the apparatus according to the invention.
Figure 4A:
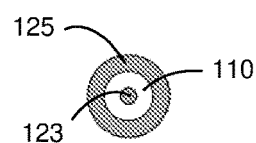
Figure 5:
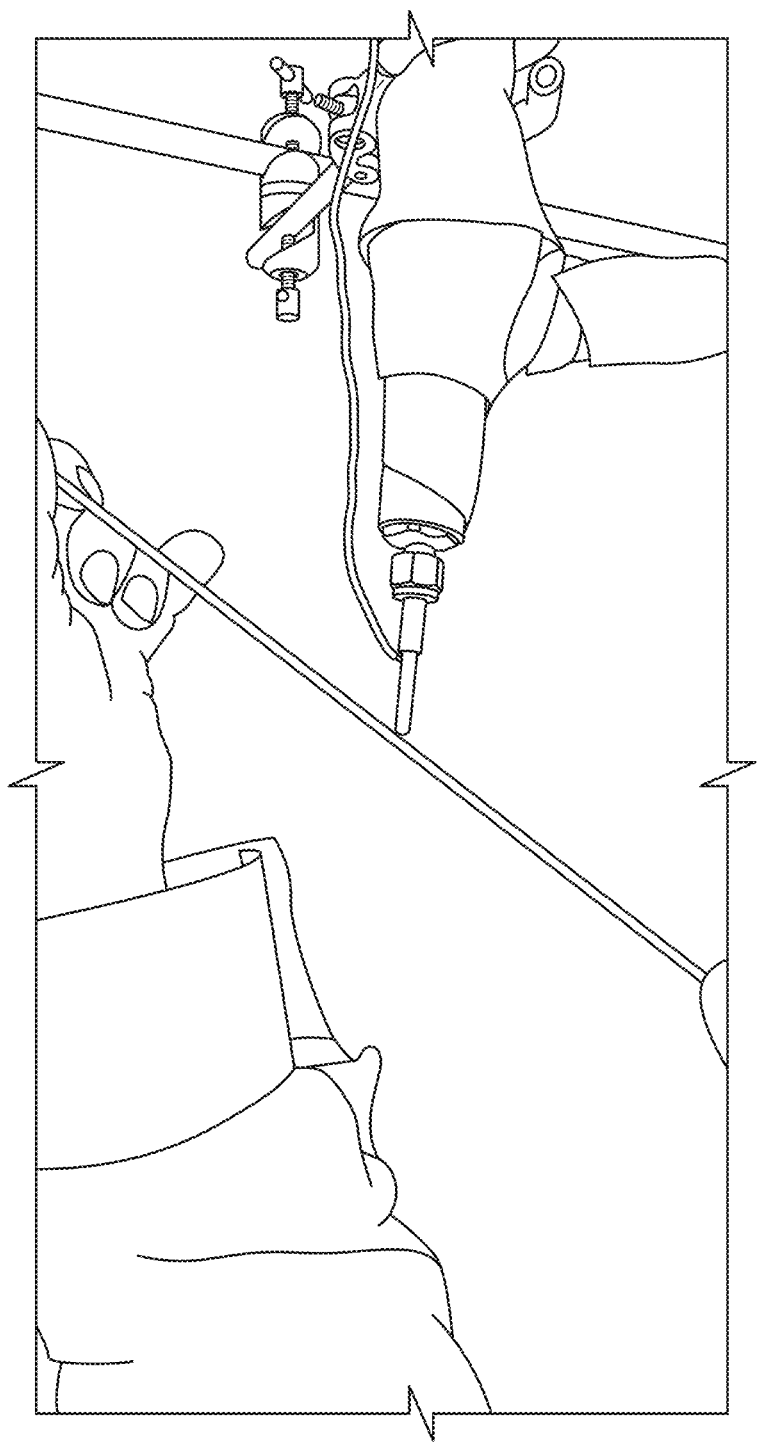
FIG. 5 is an image of frozen aqueous material being extruded from a test apparatus of the invention to press against a bearing surface/anvil that is located external to the extrusion tube.

In one form, as shown in FIGS. 4 and 4a, the apparatus may comprise an annular extrusion tube 110 that forms part of a heat exchanger. In this arrangement, the heat exchanger may also comprise a cooling element 120 having a first tube 123 that is either cooled or uncooled, and that passes through the annulus of at least the cooling portion of the extrusion tube 110 and a second tube 124 that surrounds at least the cooling portion of the extrusion tube 110. In yet another form, the heat exchanger may comprise an annular extrusion tube and the cooling element may comprise only a first tube passing through the annulus of the extrusion tube. In these forms, the extrusion tube 110 may comprise a cooling portion that extends along a portion of the tube length or along substantially the whole of the tube length.

In some forms, the outer surface of the extrusion tube 110 may comprise heat transfer members that are configured to enhance heat transfer through the wall of the tube 110. For example, the heat transfer members may comprise fins and/or ribs and/or a blade that spirals around the outer surface of the tube 110 to enhance heat transfer between the cooling element 120 and the tube 110. The heat transfer members may be located along the whole of the tube 110 or along one or more portions of the tube 110. For example, fins or ribs may be located at the inlet end portion of the tube 110 to enhance the rate of heat transfer and therefore to rapidly cool aqueous material when the material enters the inlet 111. Alternatively, the outer surface of the tube 110 may comprise a spiral blade that extends along the length of the extrusion tube 110 to enhance heat transfer. In some forms, heat transfer members are provided along only the cooling portion of the extrusion tube 110.

In some forms, the cooling element 120 may comprise a cooling material, such as a refrigerant or heat transfer fluid, which generally surrounds at least the cooling portion of the extrusion tube 110 or substantially the whole of the tube 110 to cool the aqueous material within the extrusion tube. The cooling material may be held at any suitable temperature to cool the aqueous material at the desired rate of freezing. Typical temperatures lie within the range of 0° C. to about −55° C. The desired rate of freezing will depend on the aqueous material being frozen and the properties of the material that are to be preserved. For example, the desired residence time to freeze milk is generally less than about 10 minutes. To freeze milk rapidly, cooling material is typically provided at an initial temperate of about −8 to about −30° C. at or near the inlet 111 and at a temperature of about −5 to about −15° C. at or near the outlet.

In some forms, the cooling element 120 may comprise a cooling material, such as a refrigerant or heat transfer fluid, which is sprayed onto the exterior surface of the extrusion tube 110 to enhance heat transfer rate.

In some forms, the cooling element 120 may comprise a cooling material, such as a refrigerant, whose properties and application conditions are selected to cause it to boil as heat is transferred from the extrusion tube 110, to enhance heat transfer rate.

In some forms, the extrusion tube 110 and cooling element 120 together form one or more sequential heat exchangers, each of which may be configured so that feedstock and cooling material flow in either co-current, countercurrent or cross-flow patterns.

In some forms, the apparatus 100 is configured to move the aqueous material through the extrusion tube 110 from the inlet 111 to the outlet 112 and to gradually freeze the liquid as it moves through the tube by applying cooling along at least the cooling portion of the tube, which may be most of or all of the length of the extrusion tube 110. In some forms, the temperature of the extrusion tube 110 may be consistent along its length. In other forms, the temperature of the tube may be colder near the inlet 111 than near the outlet 112 or vice versa.

The nature of the frozen material (having a dendritic structure with liquid interspersed between the dendrite crystals) provides the material with self-lubricating properties that allow the material to be pushed through the tube 110, rather than forming an immovable plug or blockage in the tube 110.

In some forms, the apparatus comprises a programmable controller 140. The programmable controller may be connected to the pump 130 and/or the cooling element 120. Where the controller 140 is connected to the pump 130, the controller may be programmed to control the speed of the pump in order to control the rate of material flow through the extrusion tube 110 and the pressure of material within the extrusion tube 110. Where the controller is connected to the cooling element 120, the controller 140 may be programmed to control the temperature of the cooling element 120 in order to control the temperature of the extrusion tube 110 as a whole or to control the temperature of portions of the extrusion tube 110, such as the cooling portion, the inlet portion, the outlet portion and a central portion located between the inlet and outlet portions. By controlling the temperature of the cooling element, it is possible to control the rate of cooling of the aqueous material within the extrusion tube 110 and therefore to control the rate of phase change of the aqueous material from liquid form to frozen form.

In some forms, the controller 140 may also be connected to one or more valves 165 along the feedstock flow path to control the timing of the valve(s) 165 opening and closing and/or to control the extent to which the valve(s) open or close.

In some forms, the apparatus 100 is configured to cause the frozen extruded aqueous material to be cut into discrete lengths or to break into discrete lengths. The dendritic structure of the frozen material provides the material with an element of solidity and brittleness that allows the material to be broken or cut. In some forms, the apparatus comprises a bearing surface 113 proximate the outlet 112. The bearing surface 113 is configured to cause a section of frozen aqueous material to break off from the remainder of the frozen extrusion when an end of the frozen extrusion presses against the bearing surface. The bearing surface may be a firm or rigid surface that may be perpendicular to or angled at a diagonal to the direction of travel of the frozen extrusion as the extrusion approaches the bearing surface. Because the extruded frozen material exhibits the properties of a solid, and in particular the solid fracture property that distinguishes a solid from a liquid, it is possible to cause the extrusion to break under its own weight or under pressure as it is pressed against a bearing surface. The solid nature of the extrusion also allows the extrusion to be cut.

In one form, the bearing surface 113 lies within the extrusion tube 110 and is located at the outlet 112 or is distanced from the outlet 112. For example, the extrusion tube 110 may have an enlarged outlet end portion and the outlet 112 may be offset from the direction of movement of the frozen extrusion within the extrusion tube 110. The bearing surface may be located within the enlarged outlet end portion and generally opposite the frozen, free end of the extrusion. The frozen, free end of the extrusion is the front end of the extrusion in the direction of travel of the extrusion. In some forms, the extrusion tube 110 comprises an end wall that forms a blind end to the tube 110 in the direction of travel. The end wall may form a bearing surface 113, as shown in FIG. 1. As the frozen extrusion is pushed through the extrusion tube 110 due to the pump 130 pushing more liquid through the inlet 111, the frozen, free end of the extruded material is caused to press against the bearing surface. The constant pressure of the extrusion against the bearing surface as more material is pumped into the extrusion tube 110 causes the extrusion to break at a distance from its free end. The broken portion forms a discrete length of frozen material, which may be referred to in this specification as a pellet or rod. In some forms, the outlet 112 is located on a lower surface of the extrusion tube 110 so that when the frozen pellet breaks off from the extrusion, the pellet falls through the outlet 112.

In another form, the bearing surface 113 may be located external to the extrusion tube 110 and generally opposite the outlet 112, as shown in FIG. 3. In this form, the outlet 112 is typically located at an end of the extrusion tube 110. For example, the tube 110 may be open at its outlet end, so that the open end of the tube 110 forms the outlet 112. The bearing surface 113 is distanced from and is generally opposite to the outlet so as to face toward the outlet. In this arrangement, as frozen material is pushed from the extrusion tube 110 as an extrusion, the free end of the extrusion contacts the bearing surface 113. As more material is pumped into the inlet 111, more frozen material is pushed from the extrusion tube 110 through the outlet 112 so that the frozen, free end of the extrusion is pushed against the bearing surface 113 until the extrusion naturally breaks at a weak point spaced from the frozen, free end. The weak point may vary each time that the extrusion breaks, but typically, the extrusion will break to create a frozen pellet of between about 20 to about 100 mm in length.

In yet another form, the frozen material may be extruded from an outlet 112 formed at an end of the extrusion tube 110 and may be continuously extruded until the extrusion breaks at a weak point as a result of its own weight. The broken off piece of frozen material forms a discrete length.

Where the apparatus 100 is configured to cause the extrusion to break into pellets of discrete length, the actual length measurements of the pellets may vary each time that the extrusion breaks because the weak point where the break occurs may be anywhere along the extrusion. The broken off pellets may fall into or onto a receiving element below.

In yet another form, the apparatus may comprise a severing element, such as a cutting or breaking element, configured to cut through or break a portion from the frozen, free end of the frozen extrusion to create frozen pellets/rods of a relatively constant length. Where the severing element comprises a cutting element, the cutting element may comprise a cutting blade that forms a cutting action to cut through the frozen extrusion at the distance from the frozen, free end of the extrusion to create a frozen pellet/rod of a discrete length. Where the severing element comprises a breaking element, the breaking element may include a hammer-like member or other suitable implement configured to apply a blunt force to the extrusion at a distance from the frozen, free end of the extrusion to break the extrusion at the point of impact in order to create a frozen pellet/rod of a discrete length. In some forms, the severing element may be connected to the programmable controller 140, which may be programmed to time the severing action of the severing element according to the rate at which the pump 130 pumps liquid though the inlet 111. In this way, the controller may be used to control the length of the pellet produced by the severing element. In other forms, the severing element itself may include a timer by which the timing of the severing action is controlled in order to control the length of the pellet produced. Other suitable systems may be used to control the timing of the severing action and therefore the length of the frozen pellet produced. For example, the severing element may comprise a sensor connected to an actuator and configured so that the sensor signals to the actuator when the frozen, free end of the extrusion reaches a predetermined location. Upon receiving the sensor signal, the actuator causes the severing element to carry out a severing action to sever/cut/break through the extrusion at a predetermined distance from the frozen, free end of the extrusion. By controlling the severing of the frozen extrusion, it is possible to control the length of the frozen pellets created.

The apparatus 100 may optionally also comprise a receiving element (not shown) for receiving and/or holding the frozen aqueous material released from the extrusion tube 110. In some forms, the receiving element may be a container that is suitable for storing the frozen product for a period of time, such as a refrigerated container for example. However, any form of container that is suitable for holding frozen material may be used, whether the container is refrigerated or not. In another form, the receiving element may be a conveyor onto which the pellets are deposited as the pellets break off from, or are cut off from, the frozen extrusion passing through the extrusion tube 110. The conveyor may convey the frozen pellets to a container or vessel for storage or transportation.

Where the aqueous material is milk, the milk may be extruded from the apparatus 100 at nominally less than 100% frozen, and may then drop to a lower temperature within a refrigerated container so as to become fully frozen. Milk is a material that freezes over a temperature range rather than at a single precise temperature: at the lower end of that freezing range some components may remain unfrozen, but as temperature is lowered further, all components are completely frozen.

The frozen pellets, such as milk or juice or chemical pellets, may be stored in refrigerated containers and/or in a refrigerated room, ready for collection and transportation elsewhere, such as to a processing plant or other organisation.

Storing the frozen material in small, discrete sizes, such as in pellet form, may be particularly useful if it is intended to thaw the frozen material at a later date relatively quickly. The pelletised/discrete material has a greater surface area/volume ratio and a smaller characteristic heat transfer distance (generally defined as the smallest distance between the external surface of the material and the centre of the material) than a solid block of frozen material and so can be thawed more rapidly. The pelletised material can also be handled in selected quantities in frozen form, whereas material frozen in a large solid block, must be cut with a special tool or must be thawed before it is able to be handled in smaller quantities. Being able to handle the frozen pelletised material in selected quantities may be especially useful when transporting the material as it allows for the weight distribution of containers holding the frozen pelletised material to be readily modified, if necessary.

The above describes an apparatus of the invention that uses a single extrusion tube 110 for freezing liquid aqueous material. However, in other forms, the apparatus may comprise multiple extrusion tubes 110 operating in parallel, such as in a tube bank, as shown in FIGS. 3 and 3a. In such an arrangement, the tubes 110 may be connected to the same reservoir or to different reservoirs. Where the tubes 110 are connected to the same reservoir 150, the same pump 130 may be used to pump liquid to each tube 110 or different pumps 130 may be used to pump liquid to one or more tubes 110. In some forms where a single pump feeds several tubes, as shown in FIG. 3a, valves 165 may be placed in the conduit between the pump 130 and each tube 110 in order to isolate individual tubes if necessary. In other forms, different pumps 130 may be used to pump liquid from the reservoirs 150 to the extrusion tubes 110, as shown in FIG. 3. This arrangement may be particularly suitable where the tubes 110 are connected to different reservoirs 150. For example, pump A may be used to pump liquid from reservoir A to tube A and pump B may be used to pump liquid from reservoir B to tube B. In any arrangement in which the apparatus comprises a plurality of extrusion tubes, the liquid aqueous feedstock material may be pumped into each tube, via the tube inlets, generally simultaneously, or consecutively or following any other suitable order, such as alternately or randomly. Typically however, the apparatus may comprise a control system to control one or more pumps of the apparatus to pump the liquid feedstock into each of the tubes generally simultaneously so that the aqueous material may be cooled within the respective extrusion tubes simultaneously.

The process of the invention utilises an apparatus 100 according to the invention and as described above. The process is typically a continuous process for freezing a flow of aqueous material in liquid form to produce at least one frozen extrusion. Each extrusion, comprising the frozen aqueous material is moved through a respective extrusion tube 110 between an inlet 111 and an outlet 112 of the tube 110. The extrusion may be broken or cut into discrete lengths to form pellets or discrete units, either before or after the frozen extrusion/material passes through the outlet 112. In some forms, where the apparatus comprises a plurality of extrusion tubes 110, the process may be configured to pump liquid feedstock material into each of the tubes 110 generally simultaneously, consecutively, alternately, or randomly or in any other suitable order. Where the aqueous feedstock material is pumped into multiple tubes generally simultaneously, the aqueous material may also be cooled within the respective tubes generally simultaneously and may optionally be extruded from the respective tubes generally simultaneously.

The process comprises the step of using a pump 130 to continuously pump aqueous material in liquid form from a reservoir 150 and into the inlet 111 of at least one extrusion tube 110 under pressure. The aqueous material within the extrusion tube 110 is rapidly cooled by the cooling element 120 to begin a progressive phase change between liquid form and frozen form. The pump 130 continues to pump aqueous material in liquid form through the inlet 111, causing existing aqueous material within the extrusion tube 110 to be pushed through the tube 110 toward the outlet 112. The material is further cooled as it moves through the tube 110 between the inlet 111 and the outlet 112 to cause substantially all of the aqueous material to change from liquid form to frozen form within the extrusion tube 110, but for some of the aqueous material to remain in liquid form.

The frozen material comprises a dendritic structure having liquid interspersed between at least some of the dendrites. The remaining material in liquid form exhibits a significant FDP and is entrapped between the dendrite crystals. In this form, the frozen aqueous material forms a semi-solid frozen extrusion that is moved through the tube 110 under pressure of the pump as the pump pushes more liquid material through the inlet 111.

The semi-solid frozen extrusion exhibits mechanical properties in that it is breakable and cuttable (able to be broken and cut), even though liquid aqueous material remains entrapped in the extrusion.

To create a semi-solid frozen extrusion comprising dendritic crystals and entrapped liquid, the rate of freezing, expressed as a fraction of total feedstock freezeable water content, preferably exceeds 0.001/s and more preferably exceeds 0.01/s for feedstocks that have a bulk freezing point depression (FPD) greater than or equal to 0.4° C.

The entrapped liquid helps to lubricate the frozen extrusion to aid movement of the extrusion through the extrusion tube 110. The entrapped liquid also prevents the frozen material from becoming fully frozen and expanding within the tube 110. In this regard, the frozen extrusion is self-lubricating and, despite being in frozen form, the frozen extrusion is able to move through the tube 110 without expanding and bursting the tube.

In some forms, the fraction of aqueous material that is in frozen form is between about 0.60 to about 0.98 and preferably between about 0.75 to about 0.95.

The frozen aqueous material will eventually be discharged through the tube outlet 112, such as by being pushed through the tube outlet under pressure from the pump, or being broken off or cut off into a discrete length and falling or otherwise being released through the outlet 112.

The frozen extrusion may be broken or cut into shorter, discrete lengths/units, to form frozen pellets for example. In some forms, the units/pellets are between about 20 to about 100 mm long. However, the apparatus and process may be configured so that units/pellets may otherwise be produced below or above this range.

In some forms, the frozen extrusion is broken or cut to a desired length within the tube and before passing through the outlet 112. For example, the apparatus 100 may comprise a bearing surface 113 within the tube 110 that causes the extrusion to break at a distance from its frozen, free end when the free end of the extrusion presses against the bearing surface 113. Alternatively, the apparatus 100 may comprise a cutting element within the tube 110 that is configured to cut through the extrusion at a set distance from the frozen, free end of the extrusion when the free end of the extrusion reaches a predetermined location, or at predetermined time intervals, for example. In other forms, the frozen extrusion is broken or cut to a desired length after the extrusion is pushed through the outlet 112. For example, a bearing surface 113, such as an anvil, may be provided at a distance from the outlet 112 and in opposing relationship to the outlet 112, so that the frozen, free end of the extrusion is pushed through the outlet 112 and against the bearing surface 113. The pressure of the extrusion against the bearing surface 113, as the pressure of more liquid being pumped through the inlet pushes the frozen, free end of the extrusion harder against the bearing surface 113, causes the extrusion to break at a distance from its frozen, free end to form a pellet. The pellet may fall into or onto a receiving element below. The broken end of the remaining portion of the extrusion now forms a frozen, free end of the extrusion and is pushed toward the bearing surface 113 as before until the extrusion breaks again to form another pellet and to produce a new frozen, free end of the extrusion. The process continues to create multiple pellets, one after the other. In yet another form, a cutting element may be located external to the outlet 112 and may be configured to cut through the extrusion at predetermined time intervals or when the frozen, free end of the extrusion reaches a predetermined location for example. In yet another form, the frozen extrusion may be left to break under its own weight after it is pushed through the outlet 112.

The frozen extrusion may be described in its bulk form as a homogeneous, amorphous solid, exhibiting the common properties of a solid, such as a Young's modulus, a tensile strength and a breaking stress. The material can be considered homogeneous at scales of over 0.5 mm, because samples of this size will not exhibit significant differences in properties attributable to varied concentration of feedstock components.

The aqueous material used in the apparatus and process of the invention may be any material for which it is desired to create frozen pellets of the material. In some forms, the aqueous material may be a food product, such as milk, smoothie mix or juice. In other forms, the aqueous material may be a chemical product. The aqueous material in its liquid form may optionally comprise a solution, emulsion or suspension.

The apparatus may be made to scale to suit the producer. For example, the apparatus may be a small scale apparatus with only one or two or more tubes and may measure about 1 m square. Alternatively, the apparatus may be made to a larger scale with many more tubes.

The apparatus and process of the invention may be particularly suitable for freezing and storing small quantities of aqueous liquid. For example, the aqueous material may be goat's milk or sheep's milk produced by a small scale farm. The apparatus and process may be used to freeze the milk for storage until transportation to a processing plant, which may not occur for several days or longer. For example, if the farm is very remote, the milk may be collected for processing weekly rather than daily. Similarly, if the farm produces milk on a very small scale, the milk may be collected for processing only when sufficient milk is available to justify the cost of collection, such as weekly or fortnightly. The apparatus and process of the invention may be useful in both of these situations because the apparatus may be made small enough to be pre-fabricated and then transported to a farm to be used by a farmer on-site without requiring high investment in equipment, plant, and installation. The apparatus and process provide a simple solution that allows milk to be frozen for safe storage so that, upon thawing, the properties of the milk are not damaged so as to distort mouthfeel. The apparatus and process of the invention may offer similar benefits for freezing other food products, such as juice. Similarly, the apparatus and process of the invention may be used to freeze chemicals in a way that does not negatively distort the properties of the chemical(s).

The present invention relies on continuous fast freezing of aqueous liquid feedstock material to create a progressive phase change between liquid and solid form without negatively impacting on the properties or characteristics of the re-thawed aqueous material. It has been found that fast freezing, where liquid feedstock freezes progressively over a temperature range, results in a fine-grained material without gross segregation of components. Continuous freezing is made possible where an aqueous feedstock material's freezing characteristics allow its frozen fraction to progressively increase with decreased temperature, to the point where the material is fully or mostly frozen, without inducing excessive mechanical stresses on the containing surface (such as the extrusion tube wall in the case of the apparatus of the invention), and where the adhesion strength between the containing surface increases with decreased temperature but is not so excessive as to cause frozen product to adhere to the interior surface of the vessel when the product is substantially frozen.

The ability to freeze and extrude aqueous material using the apparatus of the invention was an unexpected discovery because the increasing volume, that results when freezing water, was expected to block or burst the extrusion tube. However, it has been found through research that although pure water transitions from liquid to solid (ice) over a very narrow temperature range, many solutions, emulsions, and suspensions progressively freeze over a significantly larger temperature range. Within this freezing temperature range, the material comprises both liquid and solid phases. The liquid phase has been found to facilitate the flow or movement of the solid phase through the tube 110. By using the apparatus and process of the invention to control the rate at which aqueous liquid material is frozen, it is therefore possible to avoid the common mechanical problems associated with freezing pure water (such as adhesion and tube burst) and to instead create a self-lubricating frozen extrusion that passes through the extrusion tube 110 without blocking or bursting the tube 110. The aqueous solutions, emulsions and suspensions frozen using the apparatus and process of the invention exhibit a progressive increase in viscosity and ice fraction before the completely frozen state is reached. This progressive increase in viscosity is in marked contrast to the almost instantaneous transition observed when pure water transitions from liquid to solid (ice). This phenomenon is illustrated in the graph of FIG. 4.

It has been found that the difference in liquid to solid transition speed and temperature range is applicable to most solutions (in which increased concentration causes a decrease in freezing point), and to most emulsions and suspensions where the non-aqueous component of the material has a freezing temperature that is significantly different to that of water and occupies a volume that is sufficient to avoid formation of a homogenous frozen mass.

Using these findings, the apparatus and process of the invention have been created, which allow for continuous freezing of aqueous materials in a process that avoids the 'burst pipe' or 'blocked pipe' scenarios and that also avoids degradation of the properties of the aqueous material that are found after thawing, for example by avoiding a change in the properties of a food product that create an undesirable mouth feel.

Figure 6:
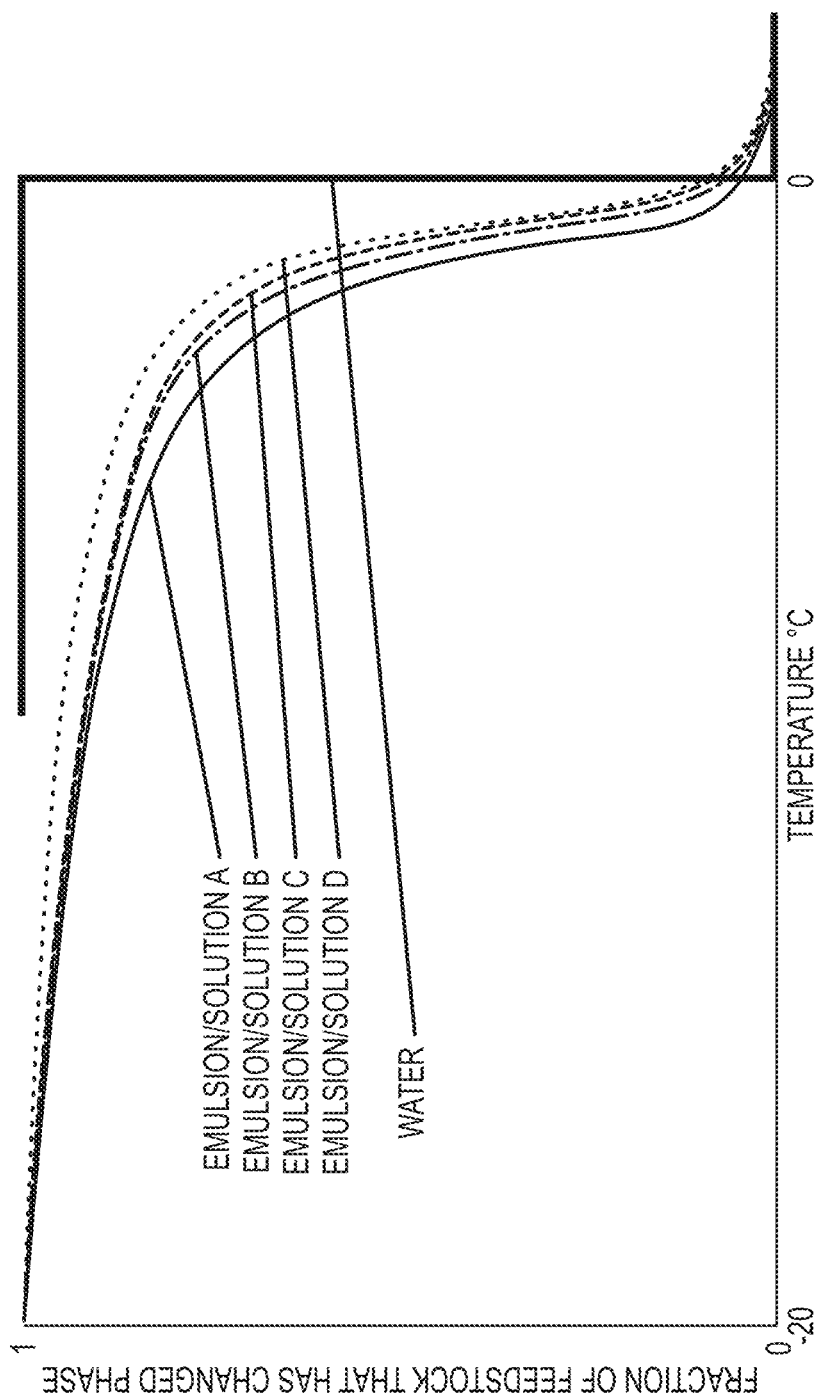
FIG. 6 shows a freeze curve of a liquid aqueous material that includes water in comparison to four different emulsions/solutions, and illustrates cases where freezing occurs across a temperature range.
Figure 7:
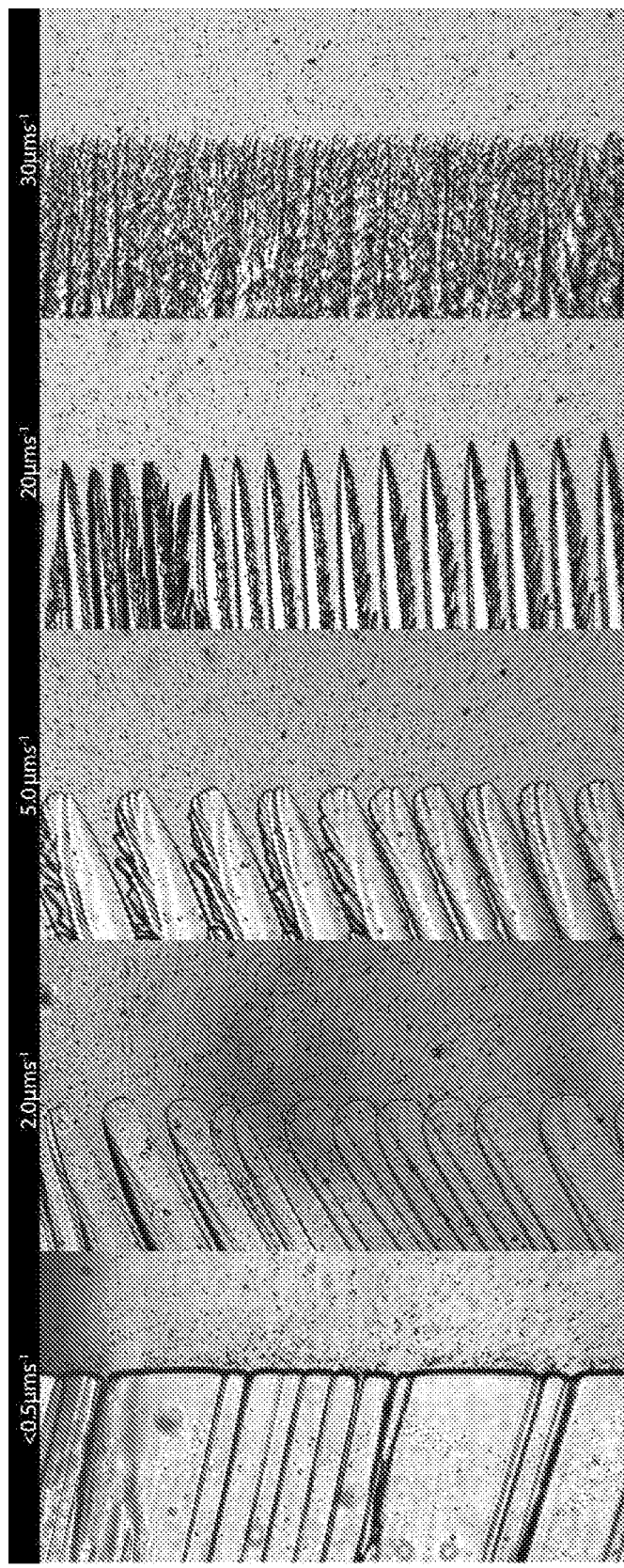
FIG. 7 is an enlarged image of dendrites formed in an aqueous material and liquid located between the dendrites, and the relationship between freezing front velocity and dendrite form, illustrating that fast freezing enables the formation of a finely structured and partially frozen feedstock that can be pumped rather than forming a solid plug.
Figure 8:
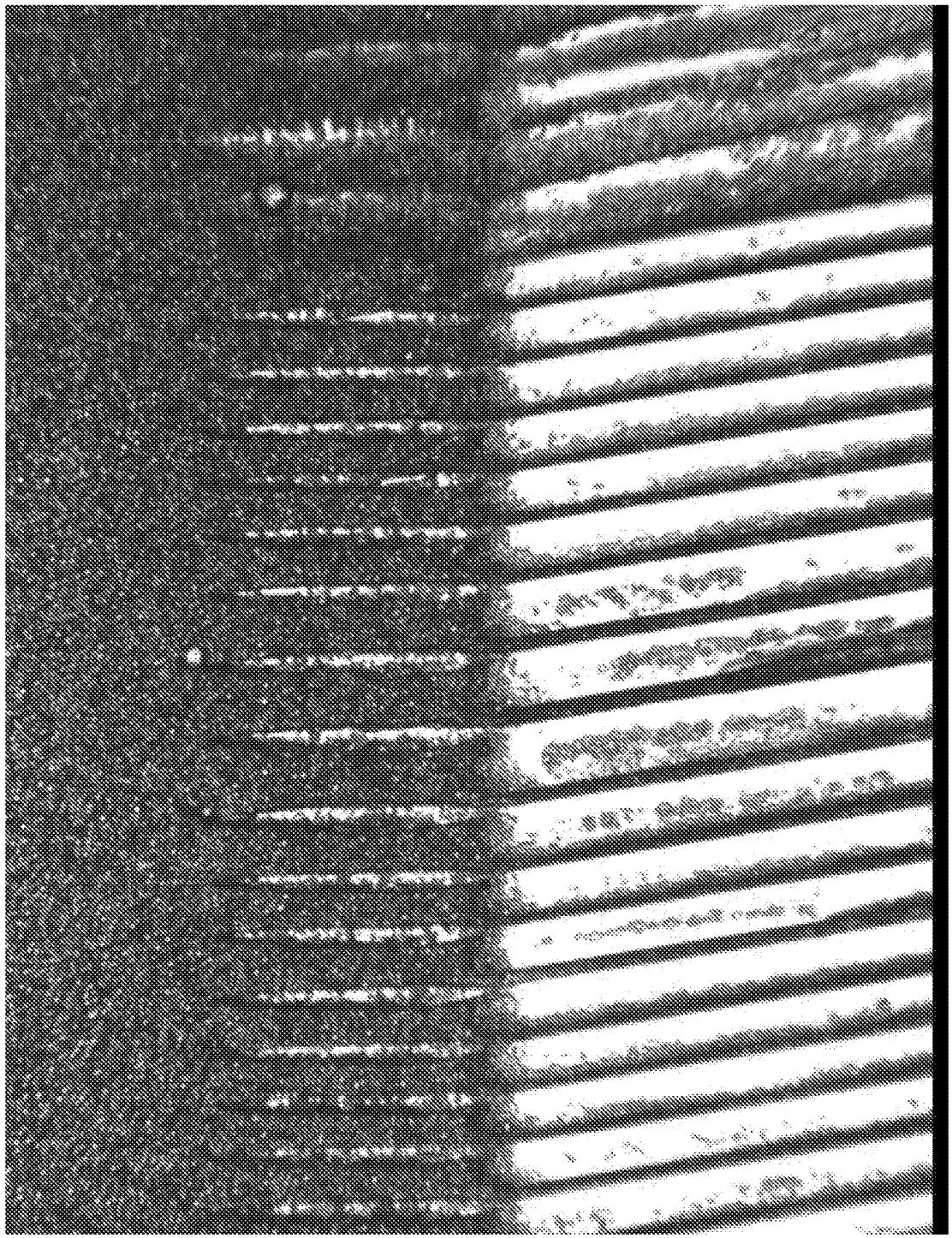
FIG. 8 is an enlarged image of ice crystals, illustrating the entrapment of solutes between ice crystals.

The rate at which the aqueous liquid is frozen in the extrusion tube 110 has been found to be important. The freezing rate is selected to rapidly freeze the liquid in order to create a fine matrix of dendrites within the aqueous material and between which liquid aqueous material of a lower freezing point is trapped, as shown in FIG. 6. It has been found that by freezing rapidly to form dendrites, liquid trapped between the dendrites acts as a lubricant to help the frozen extrusion move along/through the extrusion tube 110. In effect, the frozen extrusion is of solid form, but includes pockets of liquid that help movement of the extrusion through the extrusion tube 110. Where the aqueous material is milk, the presence of dissolved species such as lactose and salts within the milk allow the dendrites to form, whereas with pure water, the liquid would expand on freezing and the extrusion tube 110 would burst. Where the aqueous material is juice, the presence of dissolved species including glucose, fructose and acids allow dendrites to form and to trap liquid in between.

Typically, the aqueous liquid material includes enough solutes to provide a sufficient freezing point depression, as well as a sufficiently wide freezing point range. Milk has an initial freezing point depression of about 0.5° C. For almost all substances that dissolve in water, as the solute molar concentration increases, the freezing temperature decreases slightly. As pure ice forms, solutes tend to concentrate in the unfrozen mass (resulting in a decreased freezing temperature) between the substantially pure ice sections. The entrapment of solutes causes the solution's freezing point to be further depressed, causing the formation of a finely-structured frozen feedstock. Where the pure ice and the interspersed solutions are finely dispersed, the mechanical properties transition from a viscous liquid towards a breakable and cuttable semi-solid.

The geometry of the apparatus and the speed at which the pump pumps liquid through the apparatus will affect the rate of freezing of the aqueous liquid material. For a given length of the extrusion tube 110 and operational conditions, the pressure required for extrusion is inversely proportional to the characteristic dimension (i.e. the distance to the centre of the mass for heat/mass transfer).

The suitable tube thickness for the apparatus of the invention may be calculated from the pressure (p) and internal diameter (d), divided by the allowable hoop stress (σ, Pa), as shown in equation 1 below.

$$t = pd/2\sigma$$

Equation 1: Tube Thickness and Hoop Stress

Noting that the force developed by pressure must be greater than the adhesion force between the extrusion and the inner wall of the extrusion tube, equation 2 demonstrates the calculation of the pump pressure required, In this equation, $L_{tube}$ is the length of the cooling portion of the extrusion tube, $r_{tube}$ is P the internal radius of the tube, $P_{required}$ is the pressure the pump needs to operate at during operation. $K_{adhesion}$ is the "adhesion coefficient", which describes the attachment of the frozen extrusion to the inner wall of the extrusion tube and is dependent on the operating conditions of the system, and the physicochemical properties of the aqueous material.

$$P\pi r_{tube}^2 = 2\pi r_{tube} L_{tube} K_{adhesion}$$

$$P_{required} = \frac{2L_{tube}}{r_{tube}} K_{adhesion}$$

Equation 2: Pump Pressure Calculation

The temperature differential between the aqueous material and the cooling material, and the surface area of the inner wall of the tube 110 will also affect the rate of freezing. The greater the temperature difference and the greater the surface area, the greater the rate of freezing. For this reason, the liquid entering through the inlet 111 is subject to a significant temperature drop, the temperature differential being about 20° C. in some arrangements.

Equation 3 below calculates the heat transferred, by multiplying mass flow rate by the bulk enthalpy change of the feedstock. This is equated to the heat transfer calculated by multiplying the transfer area, the heat transfer coefficient U (kJ/m2K) and the Log Mean Temperature Difference (LMTD).

$$\left(\frac{dm}{dt}\right)(hFA - hFB) = \pi * d * L * U * \left(\frac{\Delta Ta - \Delta Tb}{Ln\Delta_{Ta} - Ln\Delta_{Tb}}\right)$$

Equation 3: Heat Transfer and Flow

Residence time in the extrusion tube is also important to the operation of the apparatus and process of the invention. A given volume of aqueous material, such as milk, must reside in the tube for a sufficient length of time to allow sufficient heat removal from that volume to freeze the material/milk to the desired extent. This can be calculated, as demonstrated in equation 4 below, where T is the required residence time in the extrusion tube. $L_{tube}$ is the length of the cooling portion of the extrusion tube, $r_{tube}$ is the internal radius of the extrusion tube, $\rho_{material}$ is the average density of material in the tube, $\Delta H_{fus}$ is the latent heat of fusion and $\phi_q$ is the average heat flux along the tube.

$$L_{tube}\pi r_{tube}^2 \rho_{material}\Delta H_{fus} = 2L_{tube}\pi r_{tube}\phi_q \tau$$

$$\tau = \frac{r_{tube}\rho_{material}\Delta H_{fus}}{2\phi_q}$$

Equation 4: Latent Heat Required to Freeze Volume of Liquid=Latent Heat Removed Via Heat Transfer It has been found that the apparatus and process of the invention can be used to produce semi-solid frozen concentrated product, preferably in pelletised form or in discrete units, that is able to be retained in the semi-solid frozen state during transportation. It is common to concentrate aqueous liquid materials, such as milk, using an evaporator and to then spray dry the concentrate to form a powder that allows for easy transportation with minimal risk of spoiling and microbial growth within the product. Spray drying is, however, very energy intensive. It is envisaged that the step of spray drying milk concentrate could be replaced by the present invention so that concentrated product from the evaporation stage is then semi-solid frozen and formed into discrete units for transportation. The freezing process of the invention retains the characteristics of the initial aqueous material, avoids segregation of components within the material, allows the material to be readily transported and inhibits microbial growth. Because the apparatus and process of the invention allows for aqueous materials to be rapidly frozen to a semi-solid state at about −10° C., it is estimated that using the freezing process of the present invention instead of the spray drying process could decrease the energy requirements of concentrated milk preservation by up to about 50%. The semi-solid frozen material may optionally be further cooled to about −25° C. by placing the discharged material in a freezer.

In some forms, the extruded semi-solid frozen material may then be freeze-dried. Freeze drying of a bulk-frozen material using known processes is generally slow because of mass flow limitations, and commonly causes changes in the geometry of the product when dried. The sublimating water must flow through pores in the material and form ice crystals sublimated. If the ice crystals are randomly aligned and small then the mass flow is limited. This is often the case with material that has been rapidly frozen.

Large volume samples also exhibit low mass transfer rates during freeze drying using known processes, which is due to the large distance to the centre of each sample, creating a large resistance to mass flow. Large volumes are also difficult to handle in advanced, lower cost, freeze-driers such as continuous freeze-driers.

Figure 9:
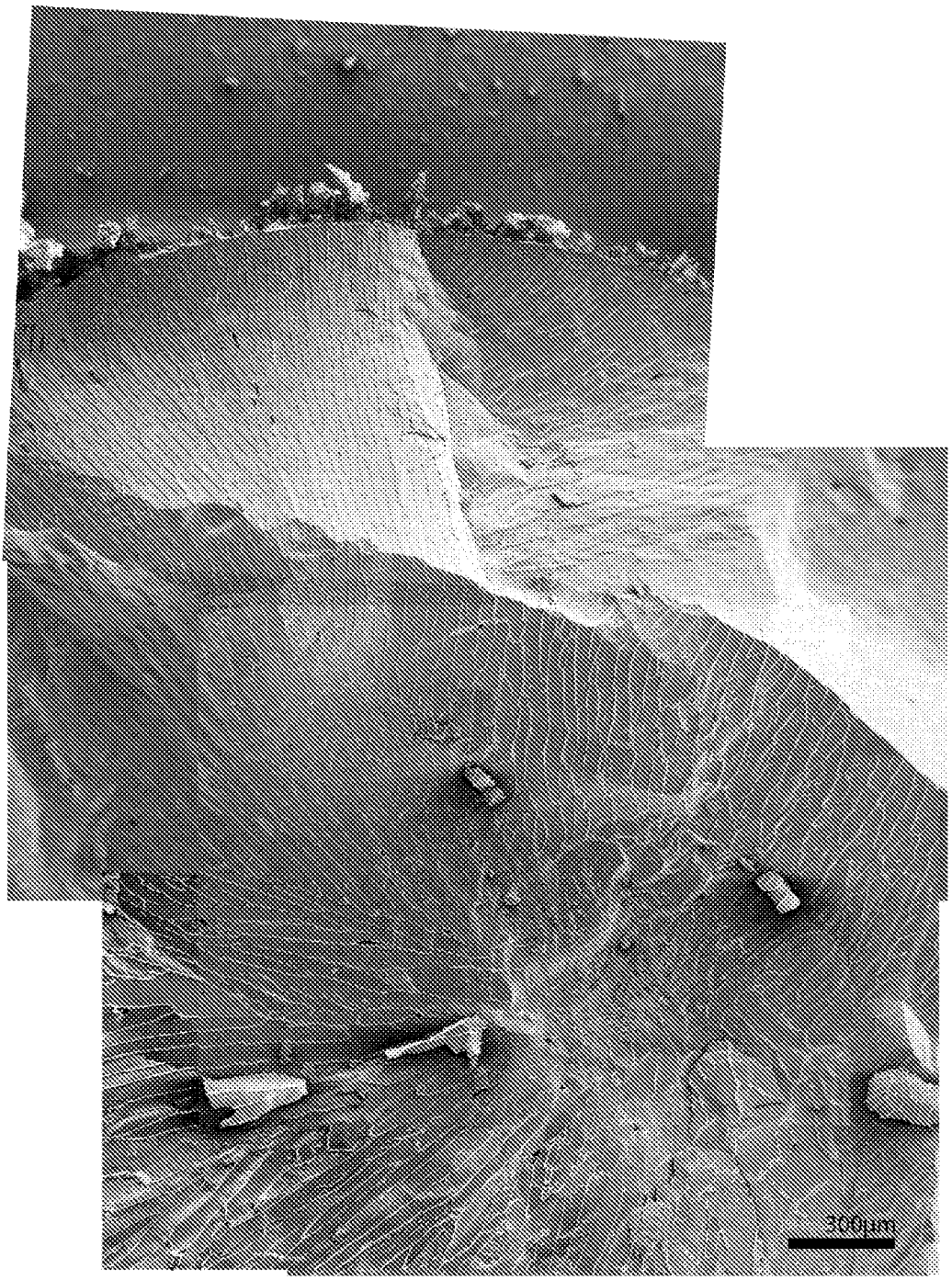
FIG. 9 is an enlarged image of ice dendrites formed in an aqueous material comprising concentrated orange juice and illustrating the predominantly radial ice crystal structure.

In contrast, the dendritic form of the ice crystals created using the system and process of the present invention allows freeze drying to occur with minimal change in geometry of the product and at a much faster rate than that of a bulk-frozen material. The dendritic ice crystals, and therefore the pores in the freeze-dried material, are aligned radially, as can be seen in FIG. 9. The characteristic heat transfer distance, i.e. the distance to the centre of the extruded material, is also generally small, at about 2 mm to about 25 mm. These factors, which are a direct result of the freezing process and system of the present invention, increase the performance of freeze-drying. The discrete nature of the extruded product is also suitable for freeze-drying by continuous freeze-dryers, which typically require a free-flowing particulate product.

The apparatus and process of the invention also allow the aqueous liquid material to be semi-solid frozen in a controlled environment, which reduces the risk of contamination of the product.

Frozen foods such as ice-cream intentionally incorporate significant volumes of air to create desired organoleptic properties when consumed directly. In contrast, it is undesirable for the aqueous liquid materials proposed to be used with the present invention to have significant volumes of entrained air, although a small volume of air may be tolerated. Large volumes of entrained air may impact on the ability of the system of the invention to achieve steady state, to operate safely, and to form the crystal structure necessary to form a semi-solid frozen product that is capable of extrusion. The presence of air may oxidise the aqueous material to the detriment of the material quality, and the bulk density is significantly reduced. The apparatus and process of the invention therefore allow for minimal physical interference with the fluid to avoid stirring or creating turbulent fluid flow as much as possible. For this reason, the extrusion tube preferably comprises no moving mechanical parts, or static mixing devices to stir the aqueous material. Moving mechanical parts and static mixing devices may also adversely attract microbial growth around the joints between parts, and complicate the cleaning and sanitisation of the system, so it is advantageous that the apparatus of the invention does not require these parts. The preferred form of the apparatus of the invention is therefore simple to clean with standard clean-in-place (CIP) procedures, such as by flushing water and/or a treatment fluid through the machine at ambient or hot temperatures. The cleaning process can therefore be carried out quickly and easily with minimum down time and without needing to disassemble the apparatus. However, in alternative forms of the invention, it is envisaged that the apparatus may be configured as a device to promote nucleation. For example, the apparatus may include roughened internal surfaces of the tube, vibrating blades within the tube, ultrasound transducers or any other features suitable to promote nucleation, as is well known in the art.

Experimental Data

Experiment 1: One form of apparatus and process of the invention was used to freeze and pelletize cow's (bovine) milk, having a typical composition of about 3.2% fat as emulsion and about 8% protein lactose and salts as dissolved solids. The apparatus was configured using a straight extrusion tube as shown in FIG. 2. The apparatus included a laboratory chiller connected to a straight tube-in-tube heat exchanger that included an inner extrusion tube 110 and an outer tube or cooling element 120. A laboratory chiller was connected to the cooling element to cool the milk within the inner extrusion tube 110. The inner tube had an internal diameter of 4.3 mm, and a wall thickness of about 1 mm, surrounded by a heat exchanger jacket with an external diameter of about 25 mm. The cooling portion of tube was 580 mm and total length was 800 mm. The apparatus also included a pump and an isolator cylinder with a free piston in contact with milk on one side and water on the other side. The pump was connected to the water side of the piston and to a water reservoir, so that the pump could be controlled to pressure water within the cylinder in order to pump milk from the other side of the cylinder through the inlet 111 of the extrusion tube 110.

In this arrangement, 300 mL of milk was loaded into the free-piston isolator. The milk was then pumped through the inlet 111 of the inner extrusion tube 110. Cooling material comprising heat transfer fluid, at a temperature of about −5.5° C. at the inlet portion of the tube 110 and about −5° C. at the outlet portion of the tube 110, was circulated through the outer tube/cooling element 120 to reduce the temperature of milk within the inner tube to about −5° C. so that the milk within the tube began to freeze. Further milk was pumped into the inner extrusion tube 110 to push the frozen milk through the extrusion tube 110 and to extrude the frozen milk from the outlet 112. The pressure required at −5° C. was about 3.6 MPa. Further experiments on the same apparatus found that the pressure within the extrusion tube 110 was about 1.5-20 MPa, for milk temperatures from about −3° to about −11° C. The frozen milk was found to extrude easily. A solid surface (metal ruler) was held at an angle and at a distance of about 30 mm from the outlet 112. As the free end of the extruded frozen milk pressed against the bearing surface, the extrusion was caused to break at or near the outlet to form a discrete length of frozen milk as a pellet of about 30 mm in length.

Experiment 2: In another arrangement, another form of apparatus and process of the invention was used to freeze and pelletize cow's (bovine) milk. The apparatus was also configured using a straight extrusion tube as shown in FIG. 2. The extrusion tube had an internal diameter of about 12 mm and a cooling portion having a length of about 1000 mm. As for Experiment 1, frozen milk was found to extrude easily, at a pressure of about 6 MPa and a cooling material temperature of about −5° C. at the inlet 121 of the cooling element.

Experiment 3: In another arrangement, another form of apparatus and process of the invention was configured with 5 m of 12 mm internal diameter tube coiled into a 150 mm diameter helical coil, located within a 200 mm diameter cylinder through which cooling material comprising heat transfer fluid was circulated. Cooling material was provided at a temperature of about −6° C. at the inlet 121 of the cooling element and at about −4.5° C. at the outlet of the cooling element. Pressure was provided at about 20 MPa. Frozen milk was found to extrude easily and continuously, at similar temperatures and pressures to the arrangements using straight tubes in experiments 1 and 2.

Experiment 4: Orange juice—One form of apparatus and process of the invention was used to freeze and pelletize single-strength orange juice, which is considered representative of juices and other aqueous substances containing a mixture of dissolved material and fibrous material. The orange juice had a total solids content of 10.3%, as determined by vacuum drying, and a dissolved solids content equivalent to 10.2° Brix. The apparatus was configured using a straight extrusion tube as shown in FIG. 2. The apparatus included a laboratory chiller connected to a straight tube-in-tube heat exchanger that included an inner extrusion tube 110 and an outer tube or cooling element 120. A laboratory chiller was connected to the cooling element to cool the orange juice within the inner extrusion tube 110. The inner tube had an internal diameter of about 4.3 mm, and a wall thickness of about 1 mm, surrounded by a heat exchanger jacket with an external diameter of about 25 mm. The cooling portion of tube was about 580 mm and total length was about 800 mm. The apparatus also included a pump and an isolator cylinder comprising a floating piston in contact with the juice on one side and water on the other side. The pump was connected to the water side of the piston and to a water reservoir, so that the pump could be controlled to pressure water within the cylinder in order to pump the juice from the other side of the cylinder through the inlet 111 of the extrusion tube 110.

In this arrangement, about 220 mL of orange juice was loaded into the isolator cylinder. The orange juice was then pumped through the inlet 111 of the inner extrusion tube 110. Cooling material comprising heat transfer fluid, at a temperature of about −14 C at the inlet portion of the tube 110 and about −10 C at the outlet portion of the tube 110, was circulated through the outer tube/cooling element 120 to reduce the temperature of the orange juice within the inner tube to about −12 C at discharge, so that the orange juice within the tube began to freeze. Further orange juice was pumped into the inner extrusion tube 110 to push the semi-solid frozen orange juice through the extrusion tube 110 and to extrude the frozen orange juice from the outlet 112. The frozen orange juice was found to extrude easily.

Experiment 5: Kiwifruit Pulp—One form of apparatus and process of the invention was used to freeze and pelletize de-seeded kiwifruit pulp, which is considered representative of fruity pulps and other aqueous substances containing a mixture of dissolved material and fibrous material. The kiwifruit pulp had a total solids content of about 16.1%, as determined by vacuum drying. The apparatus was configured using a straight extrusion tube 110 as shown in FIG. 2. The apparatus included a laboratory chiller connected to a straight tube-in-tube heat exchanger that included an inner extrusion tube 110 and an outer tube or cooling element 120. A laboratory chiller was connected to the cooling element to cool the kiwifruit pulp within the inner extrusion tube. The inner tube 110 had an internal diameter of about 4.3 mm, and a wall thickness of about 1 mm, surrounded by a heat exchanger jacket with an external diameter of about 25 mm. The cooling portion of tube was about 580 mm and total length was about 800 mm. The apparatus also included a pump and an isolator cylinder comprising a floating piston in contact with the kiwifruit pulp on one side and water on the other side. The pump was connected to the water side of the piston and to a water reservoir, so that the pump could be controlled to pressure water within the cylinder in order to pump the kiwifruit pulp from the other side of the cylinder through the inlet 111 of the extrusion tube 110.

In this arrangement, about 220 mL of kiwifruit pulp was loaded into a reservoir fluidly connected to the extrusion tube 110. The pulp was then pumped through the inlet 111 of the inner extrusion tube 110. Cooling material comprising heat transfer fluid, at a temperature of about −9° C. to −14° C. at the inlet portion of the tube 110 was circulated through the outer tube/cooling element 120 to reduce the temperature of the pulp within the inner tube to about −8° C. to −13° C. at discharge, so that the kiwifruit pulp within the tube began to freeze and form a semi-solid extrusion. Further kiwifruit pulp was continuously pumped into the inner extrusion tube 110 to push the semi-solid kiwifruit pulp extrusion through the extrusion tube 110 and to extrude the frozen kiwifruit pulp from the outlet 112. The frozen kiwifruit pulp was found to extrude easily at pressures from 10b to 60b. The extrusion broken into discrete pellets under its own weight after being extruded through the outlet 112.

Experiment 6: Coffee Concentrate—One form of apparatus and process of the invention was used to freeze and pelletize a coffee concentrate liquid, which is considered representative of aqueous substances containing dissolved foodstuffs.

The apparatus was configured using a straight extrusion tube as shown in FIG. 2. The apparatus included a laboratory chiller connected to a straight tube-in-tube heat exchanger that included an inner extrusion tube 110 and an outer tube or cooling element 120. A laboratory chiller was connected to the cooling element to cool the coffee concentrate within the inner extrusion tube 110. The inner tube had an internal diameter of about 4.3 mm, and a wall thickness of about 1 mm, surrounded by a heat exchanger jacket with an external diameter of about 25 mm. The cooling portion of tube was about 580 mm and total length was about 800 mm. The apparatus also included a pump and an isolator cylinder with a floating piston in contact with coffee concentrate on one side and water on the other side. The pump was connected to the water side of the piston and to a water reservoir, so that the pump could be controlled to pressure water within the cylinder in order to pump the coffee concentrate from the other side of the cylinder through the inlet 111 of the extrusion tube 110.

In this arrangement, about 200 mL of coffee concentrate (18% TS, 20.4° Brix) made up from freeze-dried coffee extract powder, was loaded into the isolator cylinder/reservoir in fluid connection with the extrusion tube 110. The coffee concentrate was then pumped through the inlet 111 of the inner extrusion tube 110. Cooling material comprising heat transfer fluid, at a temperature of about −11° C. at the inlet portion of the tube 110, was circulated through the outer tube/cooling element 120 to reduce the temperature of coffee concentrate to slightly above the cooling material temperature so that the coffee concentrate within the tube began to freeze and form a semi-solid extrusion. Further coffee concentrate was continuously pumped into the inner extrusion tube 110 to push the semi-solid frozen extrusion through the extrusion tube 110 and to extrude the frozen coffee concentrate from the outlet 112. The coffee concentrate was found to extrude easily, continuously and without breaks. The extrusion was cut into pellets of the desired length. The pressure required at −5° C. was about 3.6 MPa. Further experiments on the same apparatus explored the relationship between discharge temperature and pump pressure required, finding that −11° C. required about 20b, −12.5° C. required 35b, −13.6° C. required 75b. A temperature of −14.6° C. required about 120b and −15° C. required about 140b.

Experiment 7: A further trial was conducted using the same process and apparatus as above with a concentrated solution of 20% coffee and 30% maltodextrin being used as the feedstock. This material extruded easily, continuously and without breaks, at a coolant temperature of −10° C. and a pressure of 12.5-24 MPa. The frozen extrusion was cut into pellets of the desired length.

Frozen pellets were later dried by vacuum freeze drying, and displayed acceptable drying and reconstitution performance, indicating suitability of this methodology as a pre-processing step for freeze drying.

Experiment 8: Smoothie mixture—One form of apparatus and process of the invention was used to freeze and pelletize a series of "Smoothie" liquid mixes A, B and C that comprised elements of fruit, berry and plant-based dietary supplements, having a total solids level of 17-20% by weight and considered typical of aqueous substances containing a mixture of dissolved materials with additional suspended/emulsified components as well as a portion of fibrous material.

| Component (%) | Smoothie A | Smoothie B | Smoothie C |
| --- | --- | --- | --- |
| Fat | 0 | 1.42 | 2.50 |
| Protein | 1.75 | 1.25 | 2.42 |
| Dietary Fibre | 4.5 | 3.25 | 4.75 |
| Carbohydrates | 13 | 11.75 | 9.75 |
| Sugars | 9 | 9.5 | 7.5 |

The apparatus was configured using a straight extrusion tube as shown in FIG. 2. The apparatus included a laboratory chiller connected to a straight tube-in-tube heat exchanger that included an inner extrusion tube 110 and an outer tube or cooling element 120. A laboratory chiller was connected to the cooling element to cool the smoothie within the inner extrusion tube 110. The inner tube had an internal diameter of about 4.3 mm, and a wall thickness of about 1 mm, surrounded by a heat exchanger jacket with an external diameter of about 25 mm. The cooling portion of tube was about 580 mm and total length was about 800 mm. The apparatus also included a pump and an isolator cylinder with a floating piston in contact with the smoothie mix on one side and water on the other side. The pump was connected to the water side of the piston and to a water reservoir, so that the pump could be controlled to pressure water within the cylinder in order to pump the smoothie mix from the other side of the cylinder through the inlet 111 of the extrusion tube 110.

In this arrangement, about 220 mL of liquid smoothie mix (A) was loaded into the isolator cylinder. The smoothie mix was then pumped through the inlet 111 of the inner extrusion tube 110. Cooling material comprising heat transfer fluid, at a temperature of about −11° C. at the inlet portion of the tube 110, was circulated through the outer tube/cooling element 120 to reduce the temperature of smoothie mix to slightly above the cooling material temperature so that the smoothie mix within the tube began to freeze. Further smoothie mix was pumped into the inner extrusion tube 110 to push the frozen material through the extrusion tube 110 and to extrude the semi-solid frozen smoothie mix from the outlet 112.

The smoothie mixes were found to extrude easily, continuously and without breaks. The pressure required at −9° C. was about 2.2 MPa during steady state operation. Further experiments on the same apparatus explored the relationship between smoothie mix and pump pressure required, finding that mix B required about 1.5 MPa at steady state at −7° C., and smoothie mix C required 1.0 MPa at −7° C. While many other "mixes" are possible, the experimental mixes selected are considered to be typical of smoothie mixes and to represent a common range of properties.

Semi-solid frozen product was later dried by vacuum freeze drying, and displayed acceptable drying performance, indicating suitability of this methodology as a pre-processing step for freeze drying.

Experiment 9: highly concentrated whole milk—One form of apparatus and process of the invention was used to freeze and pelletize a highly concentrated whole milk (also commonly called full-fat milk) having component concentrations within typical international specification ranges (such as the Codex general standard for the use of dairy terms (CODEX STAN 206-19991) or the Food and Agricultural Organisation (FAO) definitions of milk composition). In some forms, highly concentrated milk may be produced by known evaporator systems (such as the highly concentrated milk that is commonly used as feedstock for a spray drier). This material is also considered typical of an aqueous substance with a high level of both dissolved and emulsified components.

The apparatus was configured using a straight extrusion tube as shown in FIG. 2. The apparatus included a laboratory chiller connected to a straight tube-in-tube heat exchanger that included an inner extrusion tube 110 and an outer tube or cooling element 120. A laboratory chiller was connected to the cooling element to cool the concentrated whole milk within the inner extrusion tube 110. The inner tube had an internal diameter of about 4.3 mm, and a wall thickness of about 1 mm, surrounded by a heat exchanger jacket with an external diameter of about 25 mm. The cooling portion of tube was about 580 mm and total length was about 800 mm. The apparatus also included a pump and an isolator cylinder with a floating piston in contact with concentrated whole milk on one side and water on the other side. The pump was connected to the water side of the piston and to a water reservoir, so that the pump could be controlled to pressure water within the cylinder in order to pump concentrated whole milk from the other side of the cylinder through the inlet 111 of the extrusion tube 110.

In this arrangement, about 200 mL of concentrated whole milk at 50% total solids w/w was loaded into the isolator cylinder. The whole milk concentrate was then pumped through the inlet 111 of the inner extrusion tube 110. Cooling material comprising heat transfer fluid, at a temperature of about or below −8.7° C. at the inlet portion of the tube 110, was circulated through the outer tube/cooling element 120 to reduce the temperature of concentrate to slightly above the cooling material temperature so that the concentrate within the tube began to freeze. Further concentrate was pumped into the inner extrusion tube 110 to push the frozen material through the extrusion tube 110 and to extrude the semi-solid frozen concentrate from the outlet 112. The concentrate was found to extrude easily and continuously. The pressure required at about −8.7° C. was about 10 to 15 MPa. This is a high pressure, but not harmful to the product, easily achievable and well-within safe limits of equipment.

Experiment 10: Highly concentrated skim-milk—One form of apparatus and process of the invention was used to freeze and pelletize a highly concentrated skim-milk (also commonly known as low-fat milk) having component concentrations within typical international specification ranges (such as the Codex general standard for the use of dairy terms (CODEX STAN 206-19991) or FAO definitions of milk composition), In some forms, highly concentrated skim-milk may be produced by known evaporator systems (such as the highly concentrated skim-milk that is commonly used as feedstock for a spray drier). This material is also considered typical of an aqueous substance with a high level of dissolved components.

The apparatus was configured using a straight extrusion tube as shown in FIG. 2. The apparatus included a laboratory chiller connected to a straight tube-in-tube heat exchanger that included an inner extrusion tube 110 and an outer tube or cooling element 120. A laboratory chiller was connected to the cooling element to cool the concentrated skim-milk within the inner extrusion tube 110. The inner tube had an internal diameter of about 4.3 mm, and a wall thickness of about 1 mm, surrounded by a heat exchanger jacket with an external diameter of about 25 mm. The cooling portion of tube was about 580 mm and total length was about 800 mm. The apparatus also included a pump and an isolator cylinder with a floating piston in contact with concentrated skim-milk on one side and water on the other side. The pump was connected to the water side of the piston and to a water reservoir, so that the pump could be controlled to pressure water within the cylinder in order to pump concentrated skim-milk from the other side of the cylinder through the inlet 111 of the extrusion tube 110.

In this arrangement, about 200 mL of concentrated skim-milk at 50% total solids w/w was loaded into the isolator cylinder. The skim-milk concentrate was then pumped through the inlet 111 of the inner extrusion tube 110. Cooling material comprising heat transfer fluid, at a temperature of about −8.7° C. at the inlet portion of the tube 110, was circulated through the outer tube/cooling element 120 to reduce the temperature of skim-milk concentrate to slightly above the cooling material temperature so that the skim-milk concentrate within the tube began to freeze. Further skim-milk concentrate was pumped into the inner extrusion tube 110 to push the semi-solid frozen material through the extrusion tube 110 and to extrude the frozen skim-milk concentrate from the outlet 112. The concentrate was found to extrude easily and continuously. The pressure required at −8.7° C. was about 15 MPa.

Experiment 11: Commercial bovine cream—One form of apparatus and process of the invention was used to freeze and pelletize a bovine cream having component concentrations within typical international specification ranges (such as the Codex general standard for the use of dairy terms (CODEX STAN 206-19991) or FAO definitions of milk composition).

The apparatus was configured using a straight extrusion tube as shown in FIG. 2. The apparatus included a laboratory chiller connected to a straight tube-in-tube heat exchanger that included an inner extrusion tube 110 and an outer tube or cooling element 120. A laboratory chiller was connected to the cooling element to cool the concentrated skim-milk within the inner extrusion tube 110. The inner tube had an internal diameter of about 4.3 mm, and a wall thickness of about 1 mm, surrounded by a heat exchanger jacket with an external diameter of about 25 mm. The cooling portion of tube was about 580 mm and total length was about 800 mm. The apparatus also included a pump and an isolator cylinder/feedstock reservoir with a floating piston in contact with concentrated skim-milk on one side and water on the other side. The concentrated skim milk was in fluid communication with the inner tube 110. The pump was connected to the water side of the piston and to a water reservoir, so that the pump could be controlled to pressure water within the cylinder in order to pump concentrated skim-milk from the other side of the cylinder through the inlet 111 of the extrusion tube 110.

In this arrangement, about 200 mL of bovine cream at approximately 40% total solids w/w was loaded into the isolator cylinder. The bovine cream was then pumped through the inlet 111 of the inner extrusion tube 110. Cooling material comprising heat transfer fluid, at a temperature of about −5.5° C. at the inlet portion of the tube 110, was circulated through the outer tube/cooling element 120 to reduce the temperature of bovine cream to slightly above the cooling material temperature so that the bovine cream within the tube began to freeze. Further bovine cream was pumped into the inner extrusion tube 110 to push the semi-solid frozen material through the extrusion tube 110 and to extrude the frozen bovine cream from the outlet 112. The cream was found to extrude easily and continuously. The pressure required at −5.5° C. was about 15 MPa.

The invention claimed is:

1. A continuous process for rapidly freezing a flow of aqueous material in liquid form and moving the aqueous material through at least one tube having an inlet and an outlet, the process comprising the steps of:
   a. continuously pumping aqueous material in liquid form into the tube inlet under pressure;
   b. rapidly cooling the liquid aqueous material to cause a progressive phase change in the aqueous material, wherein the aqueous material comprises enough solutes to provide a freezing point depression of at least 0.4° C. and a freezing point range such that the phase change produces a substantially radially aligned arrangement of dendrite crystals being formed in the aqueous material and between which unfrozen liquid aqueous material is trapped to form a self-lubricating frozen extrusion comprising a crystal structure;
   c. pumping the aqueous material through the tube from the tube inlet to the tube outlet; and
   d. discharging at least a portion of the self-lubricating frozen extrusion through the tube outlet as a breakable or cuttable extrusion.

2. The process of claim 1, wherein the material is cooled to form a self-lubricating frozen extrusion comprising the crystal structure as the material moves along the length of the tube.

3. The process of claim 1, wherein the extrusion is broken or cut into discrete lengths before or after passing through the outlet.

4. The process of claim 1, wherein the aqueous material is a food product.

5. The process of claim 4, wherein the aqueous material is milk.

6. The process of claim 4, wherein the aqueous material is juice.

7. The process of claim 1, wherein the aqueous material is a chemical product.

8. The process of claim 1, wherein the aqueous material in liquid form comprises a solution, emulsion or suspension.

9. The process of claim 1, wherein the step of pumping the aqueous material through the tube from the tube inlet to the tube outlet is carried out by a pump that operates between about 10 MPa and about 60 MPa.

10. The process of claim 1, wherein the aqueous material is held under pressure within the tube at a pressure of between about 1.5 MPa to about 20 MPa.

11. The process of claim 1, wherein the aqueous material is cooled to a temperature within the freezing point range of the aqueous material.

12. The process of claim 1, wherein a rate of freezing the aqueous material exceeds 0.001/s for aqueous material that has a bulk freezing point depression greater than or equal to 0.4° C.

13. The process of claim 12, wherein the rate of freezing of the aqueous material exceeds 0.01/s for feedstocks that have a bulk freezing point depression greater than or equal to 0.4° C.

14. The process of claim 1, wherein the aqueous material is pumped through the tube at a flow rate corresponding to a residence time of about 10 minutes.

15. The process of claim 1, wherein the liquid aqueous material is pumped into a plurality of tubes simultaneously and wherein the aqueous material is rapidly cooled in each tube simultaneously to cause a progressive phase change resulting in a matrix of dendrite crystals between which unfrozen liquid aqueous material is trapped to form a self-lubricating breakable or cuttable frozen extrusion.

16. The process of claim 1, wherein the liquid aqueous material comprises any one of the following: fruit juice, fruit pulp, ovine milk, bovine milk, smoothie mix, coffee concentrate, coffee concentrates with tabletting excipient to a total solids content of 50% w/w, bovine whole milk at about 50% total solids w/w, bovine skim milk at about 50% total solids w/w and bovine cream at approximately 40% total solids w/w.

* * * * *